US011803025B2

(12) United States Patent
Kempeneers et al.

(10) Patent No.: US 11,803,025 B2
(45) Date of Patent: Oct. 31, 2023

(54) FIBER OPTIC TELECOMMUNICATIONS TRAY WITH ENHANCED ACCESSIBILITY AND MANAGEMENT

(71) Applicant: COMMSCOPE CONNECTIVITY BELGIUM BVBA, Kessel-Lo (BE)

(72) Inventors: Dirk Kempeneers, Aarschot (BE); Eric Schurmans, Hogen-Geetbets (BE); Maarten Aerts, Kessel-Lo (BE); Jos Brants, Korbeek-Lo (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 17/987,407

(22) Filed: Nov. 15, 2022

(65) Prior Publication Data

US 2023/0071684 A1    Mar. 9, 2023

Related U.S. Application Data

(63) Continuation of application No. 16/755,076, filed as application No. PCT/EP2018/077373 on Oct. 9, 2018, now Pat. No. 11,536,920.

(60) Provisional application No. 62/619,507, filed on Jan. 19, 2018, provisional application No. 62/569,918, filed on Oct. 9, 2017.

(51) Int. Cl.
*G02B 6/44* (2006.01)
*G02B 6/38* (2006.01)

(52) U.S. Cl.
CPC ......... *G02B 6/4454* (2013.01); *G02B 6/3897* (2013.01); *G02B 6/44* (2013.01)

(58) Field of Classification Search
CPC ...... G02B 6/4478; G02B 6/3897; G02B 6/44; G02B 6/46; G02B 6/4453; G02B 6/4457; G02B 6/4455; G02B 6/4471; G02B 6/3801; G02B 6/3806; G02B 6/4454; G02B 6/3825; G02B 6/445; G02B 6/4477; G02B 6/4452; G02B 6/4285
See application file for complete search history.

(56) References Cited

U.S. PATENT DOCUMENTS

| 9,341,801 | B2 | 5/2016 | Clatanoff et al. |
| 10,649,167 | B2 | 5/2020 | Cornelissen et al. |
| 2006/0067636 | A1 | 3/2006 | Bludau et al. |

(Continued)

FOREIGN PATENT DOCUMENTS

| WO | 2011131505 A1 | 10/2011 |
| WO | 2018234578 A1 | 12/2018 |

OTHER PUBLICATIONS

Communication pursuant to Article 94(3) EPC, EP Application No. 18 785 335.3, dated Feb. 26, 2021, 7 pages.

(Continued)

*Primary Examiner* — Michael P Mooney
(74) *Attorney, Agent, or Firm* — Merchant & Gould P.C.

(57) ABSTRACT

A fiber optic telecommunications tray is provided with features that improve accessibility and handling of fibers and/or cables in the tray. The tray may include a combination of a fiber storage device, a fiber splice device, and a fiber termination device, which are arranged in a particular order. Alternatively, the tray may include a plurality of fiber termination devices. Further, the tray may include a fiber funneling structure that make is easy to route and retain fibers in the tray.

12 Claims, 16 Drawing Sheets

(56) References Cited

U.S. PATENT DOCUMENTS

| | | | |
|---|---|---|---|
| 2009/0185782 A1* | 7/2009 | Parikh .................. | G02B 6/4442 |
| | | | 385/135 |
| 2013/0108225 A1 | 5/2013 | Ray et al. | |
| 2014/0321825 A1 | 10/2014 | Claessens et al. | |
| 2015/0346449 A1 | 12/2015 | Clatanoff et al. | |
| 2016/0161693 A1 | 6/2016 | Loeffelholz et al. | |
| 2017/0363831 A1* | 12/2017 | Cornelissen ......... | G02B 6/4471 |
| 2020/0124803 A1* | 4/2020 | Geens .................. | G02B 6/3897 |

OTHER PUBLICATIONS

International Search Report and Written Opinion of the International Searching Authority for International Patent Application No. PCT/EP2018/077373 dated Mar. 8, 2019, 19 pages.

* cited by examiner

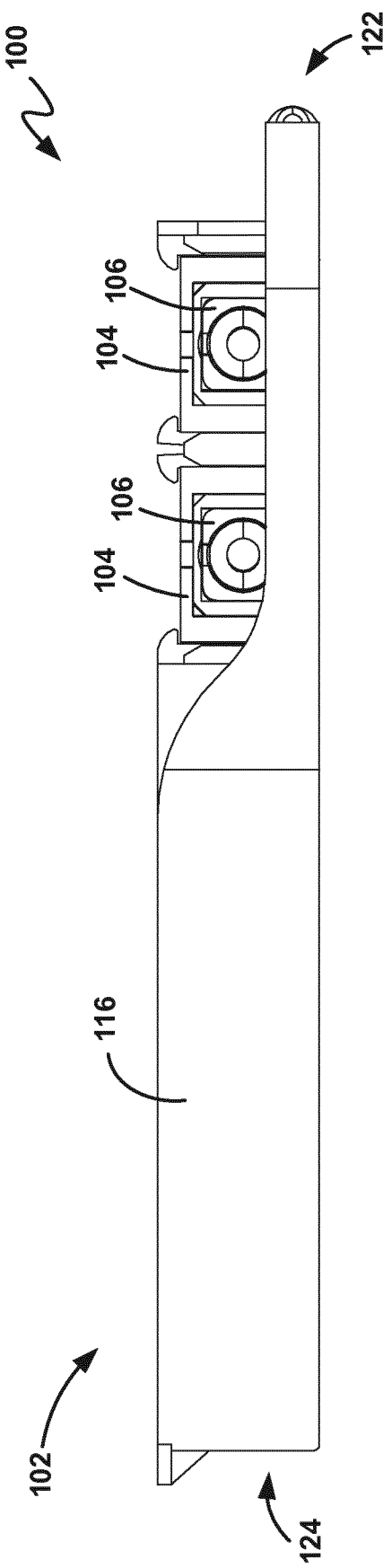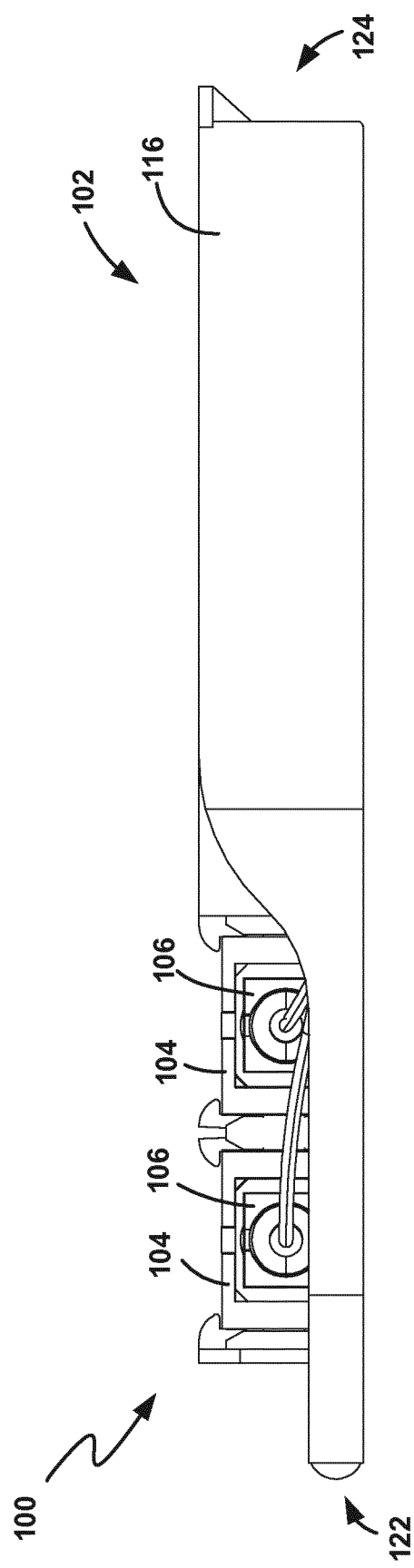

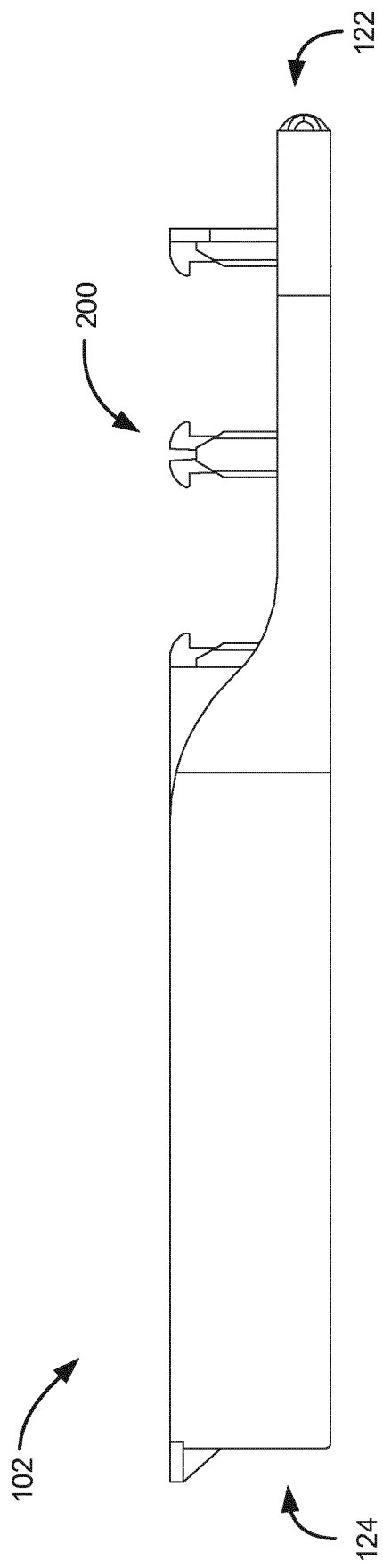
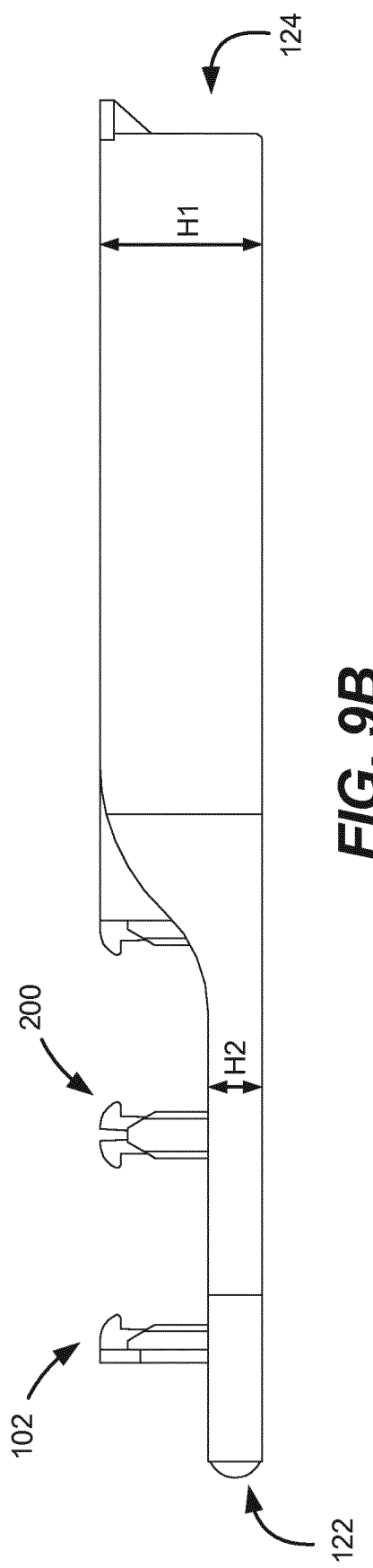
FIG. 9A
FIG. 9B

FIBER OPTIC TELECOMMUNICATIONS TRAY WITH ENHANCED ACCESSIBILITY AND MANAGEMENT

CROSS-REFERENCE TO RELATED APPLICATIONS

This application is a continuation of U.S. patent application Ser. No. 16/755,076, filed on Apr. 9, 2020, which is a National Stage Application of PCT/EP2018/077373, filed on Oct. 9, 2018, which claims the benefit of U.S. Patent Application Ser. No. 62/569,918, filed on Oct. 9, 2017, and claims the benefit of U.S. Patent Application Ser. No. 62/619,507, filed on Jan. 19, 2018, the disclosures of which are incorporated herein by reference in their entireties. To the extent appropriate, a claim of priority is made to each of the above disclosed applications.

BACKGROUND

Optical fiber distribution systems may include equipment such as fiber management trays that are mounted in telecommunications closures or at other locations. Fiber management trays are commonly used to manage, store and protect optical fibers and optical splices. Fiber management trays include fiber routing paths for allowing excess length of optical fiber to be stored in looped configurations without violating minimum bend radius requirements for the optical fiber. Fiber management trays typically include fiber guide structures that define the fiber routing paths and splice storage locations. Fiber optic components such as fiber optic fusion splice holders, passive optical splitters and wavelength division multiplexers are often mounted to fiber management trays. Improvements in fiber management trays are needed for optical fiber accessibility and handling.

SUMMARY

In general terms, the present disclosure relates to a telecommunications management device. In one possible configuration and by non-limiting example, the telecommunication management device includes a fiber management tray for managing optical fibers. Various aspects are described in this disclosure, which include, but are not limited to, the following aspects.

One aspect is a fiber optic telecommunications tray including a base plate, a cable containment wall structure, a fiber storage device, a fiber splice device, and a fiber termination device. The cable containment wall structure extends from the base plate and defining a cable management space on the base plate. The fiber storage device is arranged in the cable management space and configured to route and store fibers. The fiber splice device is arranged in the cable management space and configured to hold spliced fibers. The fiber termination device is arranged in the cable management space and configured to hold connectorized ends of the fibers.

In certain examples, the fiber storage device, the fiber splice device, and the fiber termination device are arranged in the order in the fiber optic telecommunications tray.

In certain examples, the fiber optic telecommunications tray has a proximate side and a distal side opposite to the proximate side. The fiber storage device may be arranged adjacent the distal side of the tray, the fiber termination device may be arranged adjacent the proximate side of the tray, and the fiber splice device may be arranged between the fiber storage device and the fiber termination device.

In certain examples, the fiber termination device includes one or more fiber optic adapters for receiving the connectorized ends of the fibers. In certain examples, the fiber splice device includes a plurality of splice slots configured to receive the spliced fibers.

Another aspect is a fiber optic telecommunications tray including a base plate, a cable containment wall structure, and a plurality of fiber termination devices. The cable containment wall structure extends from the base plate and defining a cable management space on the base plate. The plurality of fiber termination devices is arranged in the cable management space and configured to hold connectorized ends of the fibers. In certain examples, the fiber optic telecommunications tray is free of a fiber storage device and a fiber splice device.

In certain examples, the fiber optic telecommunications tray has a proximate side and a distal side opposite to the proximate side. The plurality of fiber termination devices may be oriented and arranged in parallel between the proximate side and the distal side.

Yet another aspect is a fiber optic telecommunications tray including a base plate, a cable containment wall structure, and a fiber termination device. The cable containment wall structure extends from the base plate and defining a cable management space on the base plate. The fiber termination device is arranged in the cable management space and configured to hold connectorized ends of the fibers. The cable containment wall may include a main outer wall, a first entrance outer wall, and a second entrance outer wall. The main outer wall is arranged at a distal side of the fiber optic telecommunications tray. The first entrance outer wall is arranged at a first cable entrance side of the fiber optic telecommunications tray and connected to the main outer wall. The second entrance outer wall is arranged at a second cable entrance side of the fiber optic telecommunications tray and connected to the main outer wall, the second cable entrance side being opposite to the first cable entrance side. The first entrance outer wall has a height lower than a height of the main outer wall, and the second entrance outer wall has a height lower than the height of the main outer wall.

In certain examples, the cable containment wall structure further includes a first entrance inner wall and a second entrance inner wall. The first entrance inner wall is arranged to be parallel with the first entrance outer wall and defines a first cable guide channel between the first entrance inner wall and the first entrance outer wall. The second entrance inner wall is arranged to be parallel with the second entrance outer wall and defines a second cable guide channel between the second entrance inner wall and the second entrance outer wall. The first entrance inner wall has a height lower than the height of the main outer wall, and the second entrance inner wall has a height lower than the height of the main outer wall.

In certain examples, the cable containment wall further includes a lower outer wall arranged at a proximate side of the fiber optic telecommunications tray, the proximate side being opposite to the distal side.

In certain examples, a tray mounting interface is arranged at the proximate side of the fiber optic telecommunications tray and configured to mount the fiber optic telecommunications tray to a structure.

In certain examples, the fiber termination device is arranged adjacent the proximate side of the fiber optic telecommunications tray.

Yet another aspect is a fiber optic telecommunications tray including a base plate, a cable containment wall structure, and a fiber funneling structure. The cable containment wall structure extends from the base plate and defines a cable management space on the base plate. The fiber funneling structure defines a fiber passage thereunder to retain a fiber that routes through the fiber passage in the cable management space. The fiber funneling structure has a fiber insertion slot that receives the fiber into the fiber passage therethrough. The fiber funneling structure is configured to guide the fiber to be inserted to the fiber passage through the fiber insertion slot when being pushed from a first side of the fiber funneling structure in a first direction extending across to the fiber funneling structure.

In certain examples, the fiber funneling structure is further configured to impede insertion of the fiber to the fiber passage through the fiber insertion slot when being pushed from a second side of the fiber funneling structure opposite to the first side in a second direction opposite to the first direction.

In certain examples, the fiber funneling structure includes a pair of fiber retention tabs extending from the cable containment wall structure above the base plate to define the fiber passage under the pair of fiber retention tabs, the fiber insertion slot being formed between the pair of fiber retention tabs. In certain examples, the pair of fiber retention tabs are configured to form a generally concave interface at the first side of the fiber funneling structure and form a generally convex interface at the second side of the fiber funneling structure.

In certain examples, the fiber funneling structure includes a fiber engagement/disengagement barrier configured to hinder engagement and disengagement of the fiber through the fiber insertion slot in the second direction. In certain examples, the fiber engagement/disengagement barrier includes a shroud section that partially covers the fiber insertion slot at the second side in the second direction. In certain examples, the fiber engagement/disengagement barrier is formed by the fiber insertion slot being oriented to extend substantially across a curvature of the fiber when the fiber passes through the fiber passage and are retained under the fiber funneling structure.

Yet another aspect is a method for managing a fiber in the fiber optic telecommunications tray. The method may include moving a portion of a fiber toward the fiber funneling structure at the first side in the first direction; and pushing the portion of the fiber into the fiber insertion slot from the first side in the first direction until the fiber is inserted into the fiber passage and retained under the fiber funneling structure.

Yet another aspect is a fiber optic telecommunications tray. The tray includes a base plate, a cable containment wall, and a connectorized fiber connection device. The cable containment wall extends from the base plate and defines a cable management space on the base plate. The connectorized fiber connection device is arranged in the cable management space and includes one or more adapter holder arrangements. In certain examples, two adapter holder arrangements are provided to the tray. Each adapter holder arrangement includes an adapter access aperture and a pair of adapter holding blocks. The adapter access aperture is defined through the base plate and configured to allow a fiber optic adapter to at least partially pass therethrough. The pair of adapter holding blocks extends from the base plate and is arranged oppositely with the adapter access aperture therebetween. The pair of adapter holding blocks is configured to movably hold the fiber optic adapter therebetween by an interference fit and selectively allow the fiber optic adapter in a storage position or in an access position. In the storage position, the fiber optic adapter is held by the pair of adapter holding blocks above the adapter access aperture and arranged to be parallel with the base plate. In the access position, the fiber optic adapter is held by the pair of adapter holding blocks and arranged to pass through the adapter access aperture at an angle relative to the base plate.

In certain examples, the pair of adapter holding blocks includes contact lips configured to press against an adapter body of the fiber optic adapter when the fiber optic adapter is held between the pair of adapter holding blocks.

In certain examples, the connectorized fiber connection device further includes a pair of latching devices extending from the base plate and arranged oppositely with the adapter access aperture therebetween. The pair of latching devices is configured to movably latch the fiber optic adapter therebetween.

In certain examples, the pair of latching devices includes latching hooks extending over the fiber optic adapter when the fiber optic adapter is latched between the pair of latching devices.

In certain examples, the pair of adapter holding blocks are arranged adjacent the pair of latching devices, respectively.

In certain examples, the connectorized fiber connection device further includes a balance bar at least partially crossing the adapter access aperture and configured to provide a pivot point around which the fiber optic adapter is rotated and arranged at the angle relative to the base plate.

In certain examples, the cable containment wall includes a main outer wall, a first entrance outer wall, and a second entrance outer wall. The main outer wall is arranged at a distal side of the fiber optic telecommunications tray. The first entrance outer wall is arranged at a first cable entrance side of the fiber optic telecommunications tray and connected to the main outer wall. The second entrance outer wall is arranged at a second cable entrance side of the fiber optic telecommunications tray and connected to the main outer wall. The second cable entrance side is opposite to the first cable entrance side. The first entrance outer wall has a height lower than a height of the main outer wall, and the second entrance outer wall has a height lower than the height of the main outer wall.

In certain examples, the cable containment wall further includes a first entrance inner wall and a second entrance inner wall. The first entrance inner wall is arranged to be parallel with the first entrance outer wall and defines a first cable guide channel between the first entrance inner wall and the first entrance outer wall. The second entrance inner wall is arranged to be parallel with the second entrance outer wall and defines a second cable guide channel between the second entrance inner wall and the second entrance outer wall. The first entrance inner wall has a height lower than the height of the main outer wall, and the second entrance inner wall has a height lower than the height of the main outer wall.

In certain examples, the cable containment wall further includes a lower outer wall arranged at a proximate side of the fiber optic telecommunications tray. The proximate side is opposite to the distal side.

In certain examples, a tray mounting interface is arranged at the proximate side of the fiber optic telecommunications tray and configured to mount the fiber optic telecommunications tray to a structure.

In certain examples, the connectorized fiber connection device is arranged adjacent the proximate side of the fiber optic telecommunications tray.

In certain examples, the fiber optic adapter includes an adapter body having a first port and a second port opposite to the first port. The first port is configured to receive a first connectorized fiber, and the second port is configured to receive a second connectorized fiber.

Yet another aspect is a method for managing fibers. The method includes providing the fiber optic telecommunications tray described herein; inserting a fiber optic adapter to the connectorized fiber connection device; rotating the fiber optic adapter to the access position; inserting connectorized fibers to the fiber optic adapter; and rotating the fiber optic adapter to the storage position.

In certain example, the method further includes pivotally mounting the fiber optic telecommunications tray to a structure.

In certain example, the method further includes stacking a plurality of the fiber optic telecommunications tray described herein.

BRIEF DESCRIPTION OF THE DRAWINGS

FIG. 3A is a side view of the fiber optic telecommunications tray assembly of FIG. 1.

FIG. 3B is an opposite side view of the fiber optic telecommunications tray assembly of FIG. 1.

FIG. 9A is a side view of the fiber optic telecommunications tray of FIG. 5.

FIG. 9B is an opposite side view of the fiber optic telecommunications tray of FIG. 5.

DETAILED DESCRIPTION

Figure 1:
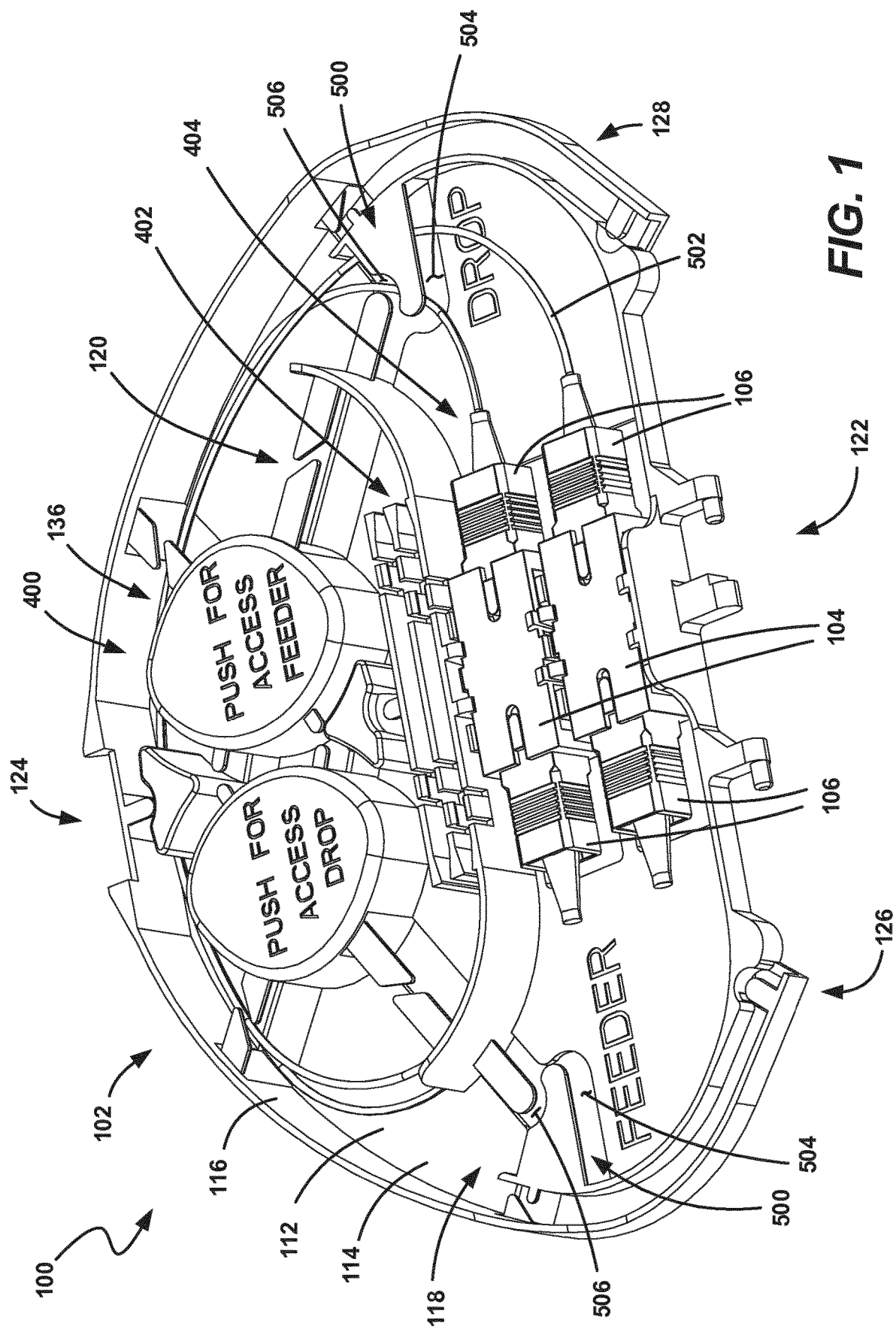
FIG. 1 is a perspective view of a fiber optic telecommunications tray assembly in accordance with an exemplary embodiment of the present disclosure.

Various embodiments will be described in detail with reference to the drawings, wherein like reference numerals represent like parts and assemblies throughout the several views.

Referring to FIGS. 1-4, a fiber optic telecommunications tray assembly is described in accordance with an exemplary embodiment of the present disclosure. The fiber optic telecommunications tray assembly 100 includes a fiber optic telecommunications tray 102, a fiber optic adapter 104, and one or more fiber optic connectors 106.

The fiber optic telecommunications tray 102 is configured to receive, store, and manage optical fibers or fiber optical cables therein. It is understood that the tray 102 can be used for optical fibers or fiber optic cables in similar manners. Therefore, the terms, "fiber(s)" and "cable(s)," are interchangeably used to describe various features of the tray in this document. The tray 102 can be of various types, such as a splice tray, splitter tray, a combination thereof, and a housing device having other functions. The tray 102 includes a main body 112 that has a base plate 114 and a cable containment wall 116. In the illustrated example, the cable containment wall 116 extends upwardly from a front side (or a top surface) 118 of the base plate 114 and defines at least a portion of a periphery of the main body 112 of the tray 102 that surrounds the base plate 114. As described herein, the cable containment wall 116 can further include walls provided within the periphery of the main body 112.

The cable containment wall 116 defines a cable management space 120 on the base plate 114. As described herein, the cable management space 120 are configured to route fibers, connect (e.g., splice) fibers, store slack or loops of fibers, and organize fibers as necessary. Various structures can be provided in the cable management space 120 including splices and/or storage of cables, which will be described below. Various additional structures can be provided for managing and organizing the fiber optic cables, including a divider wall and cable/fiber retention tabs.

The base plate 114 of the main body 112 is shown as including a generally flat body of a suitably rigid or resilient plastic or polymeric material, although alternatives are possible. According to some examples, the tray 102 may be formed of a polymeric material, such as, polypropylene, polyethylene, nylon, ABS, PMMA, some other material or any combination thereof. In other examples, the tray 102 may be formed of any suitable rigid or semi-rigid material.

In some examples, the tray 102 has a proximate side 122 and a distal side 124 opposite to the proximate side 122. As described herein, the tray 102 can be mounted to a structure at the proximate side 122, such as a tray mounting plate, a fiber optic terminal, a fiber optic splice terminal, or other type of housing/enclosure. For example, the tray 102 is pivotally mounted to such a structure at the proximate side 122 so that the distal side 124 can be rotated relative to the structure. The tray 102 is configured to have a thin plate profile, and thus a plurality of trays 102 is stackable in a limited space.

Further, the tray 102 has a first cable entrance side 126 and a second cable entrance side 128. The first and second cable entrance sides 126 and 128 are provided with various features, as described herein, which are configured to receive and guide cables or fibers entering or exiting the tray 102. The first cable entrance side 126 can be arranged to be opposite to the second cable entrance side 128. The first and second cable entrance sides 126 and 128 can be arranged in various configurations in other embodiments. In the illustrated example, the first and second cable entrance sides 126 and 128 are arranged at the proximate side 122 of the tray 102. In other examples, the first and second cable entrance sides 126 and 128 are arranged closer to the proximate side 122 than to the distal side 124 of the tray 102. In yet other examples, the first and second cable entrance sides 126 and 128 can be arranged in different configurations with respect to the proximate side 122 and the distal side 124 of the tray 102.

As described herein, the cable containment wall 116 can function as fiber guides and have curvatures suitable with minimum bend radius requirements of fibers managed on the tray 102.

The tray 102 includes a radius limiter structure 136 formed from a plurality of spaced apart lobes 138. Taken together, the lobes 138 ensure a minimum bend radius of fibers stored on the tray 102. The radius limiter structure 136 (e.g., fiber routing guide) is positioned on the top surface 118 of the base plate 114 in the cable management space 120 and configured to store optical fibers. The radius limiter structure 136 projects upwardly from the top surface 118 of the base plate 114 and cooperate to define a protected main fiber management path 140 (e.g., a fiber management loop) at the top surface 118 of the base plate 114. The radius limiter structure 136 is constructed to limit the bend radius of fibers or cables when the fibers or cables are wrapped about the limiters for storage and/or organizational purposes. The radius limiter structure 136 can also assist and retain optical fibers in a looped configuration. The management path 140 can also include the spaces between the lobes 138, which allow for additional cable routing pathways.

The main fiber management path 140 is defined between the lobes 138 and the fiber containment wall 116. To retain the optical fibers within the main fiber management path 140, a first plurality of fiber retention tabs 142 (also referred to as fingers) extend from the lobes 138 over the main fiber management path 140 in a direction towards the fiber containment wall 116. Additionally, a second plurality of fiber retention tabs 144 extend from the fiber containment wall 116 over the main fiber management path 140 in a direction towards the lobes 138. The retention tabs 142, 144 extend towards each other, but leave a gap or space 146 therebetween such that cables or fibers can be inserted or removed from the main fiber management path 140.

In the example depicted, one radius limiter structure 136 is shown on the base plate 114. Although one radius limiter structure 136 is primarily shown, it is understood that no radius limiter structure or any number of radius limiter structures may be used in other examples. In one example, the radius limiter structure 136 may be monolithically formed with the base plate 114 to define a one-piece unit. In certain examples, at least one inner fiber guide wall (not shown) may be used as a fiber routing guide on the tray 102. The inner fiber guide wall can project upwardly from the top surface 118 of the base plate 114, although multiple inner fiber guide walls may be used.

Referring still to FIG. 1-4, the tray assembly 100 includes the fiber optic adapter 104 that is removably mounted to the tray 102. As described herein, the fiber optic adapter 104 is movably supported in the cable management space 120 for improved access to the fiber optic adapter 104 for connecting fiber optic connectors 106 therethrough. The fiber optic adapter 104 is configured to connect (e.g. couple or splice) a pair of fiber optic connectors 106 with each other. The fiber optic connectors 106 are used to terminate and provide connectorized fibers. The fiber optic connectors 106 used in the tray can be of various types, such LC, SC, MPO, MTP, MT-RJ, or any other suitable connectors. Accordingly, the fiber optic adapter 104 used in the tray can be configured to receive various types of such connectors. Further, some examples of the fiber optic adapter 104 are configured to receive two pairs (e.g., duplex) of fiber optic connectors. Other configurations of the fiber optic adapter 104 are also possible in other examples.

In the illustrated example, two fiber optic adapters 104 are movably retained in the tray 102. A first fiber optic adapter 104A and a second fiber optic adapter 104B are arranged to be parallel with each other. For example, the first fiber optic adapter 104A is disposed in the tray 102 along a first axis X1 extending between the first cable entrance side 126 and a second cable entrance side 128, and a second fiber optic adapter 104B is disposed in the tray 102 along a second axis X2 that is parallel with, and offset from, the first axis X1. In other examples, other arrangements are also possible. As illustrated in FIGS. 3A and 3B, the tray 102 is configured such that the fiber optic adapters 104 and the fiber optic connectors 106 do not extend beyond the height of the fiber containment wall 116. Although the adapters 104 and connectors 106 are satisfactorily stored in the tray 102, the connectors 106 are not easily accessible when they are in a storage position as illustrated in FIGS. 1-4. As described herein, the tray 102 provides various features that allow enhance access to the adapters 104 so that the connectors 106 are installed to, or removed from, the adapters 104 easily.

Figure 2:
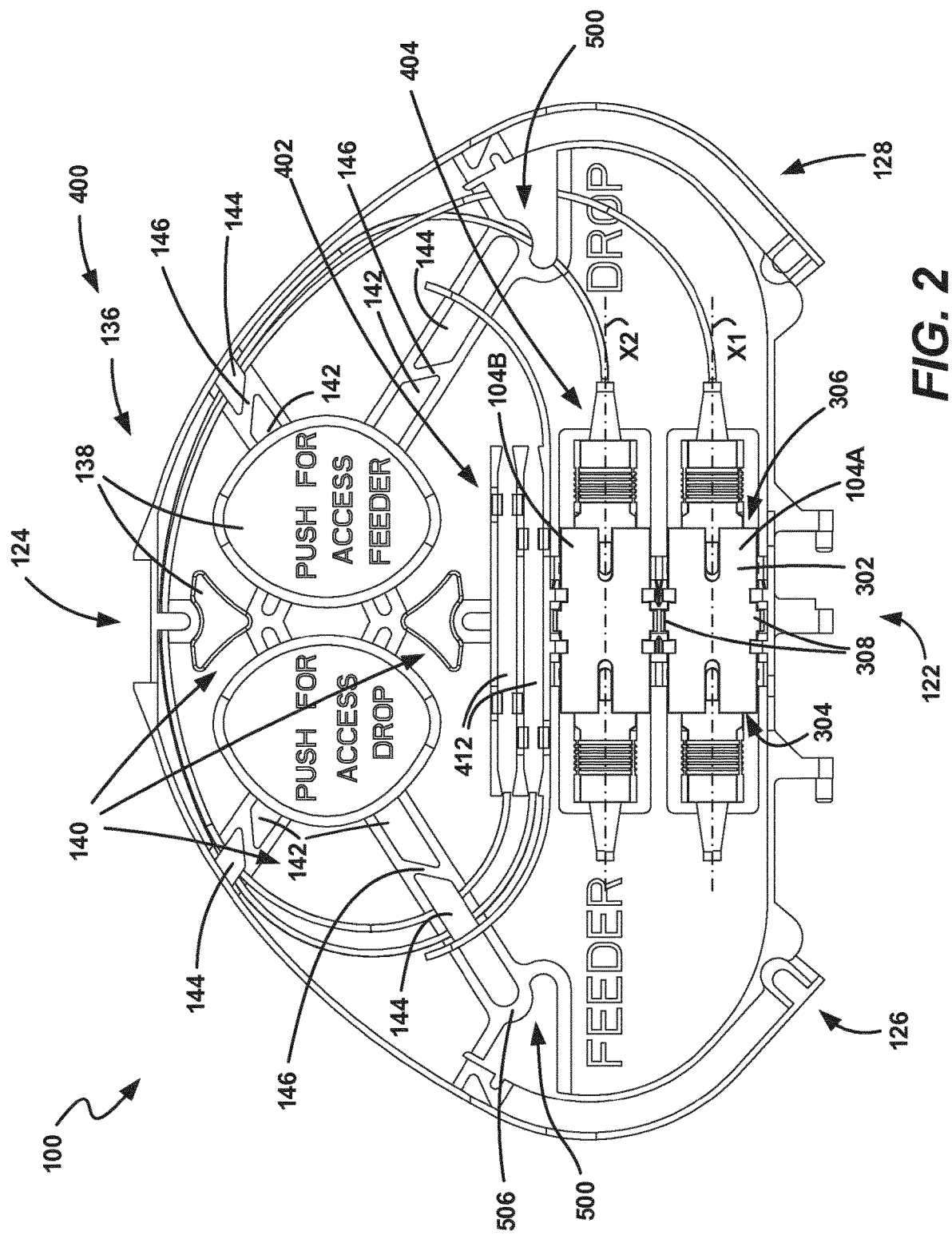
FIG. 2 is a top view of the fiber optic telecommunications tray assembly of FIG. 1.
Figure 4:
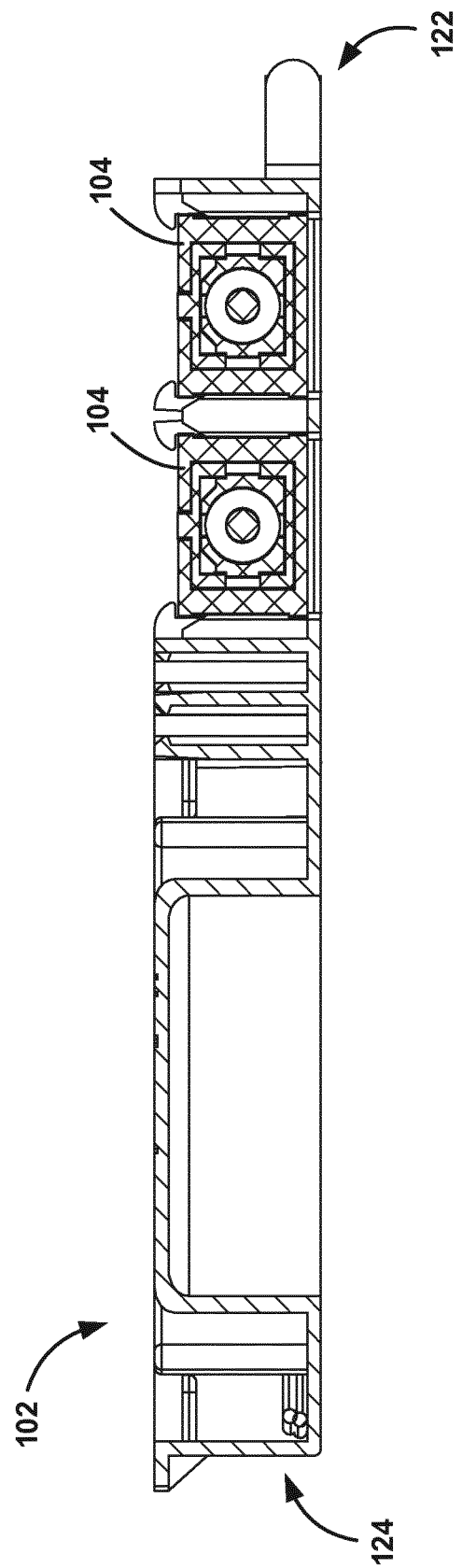
FIG. 4 is a cross sectional side view of the fiber optic telecommunications tray assembly of FIG. 1.
Figure 5:
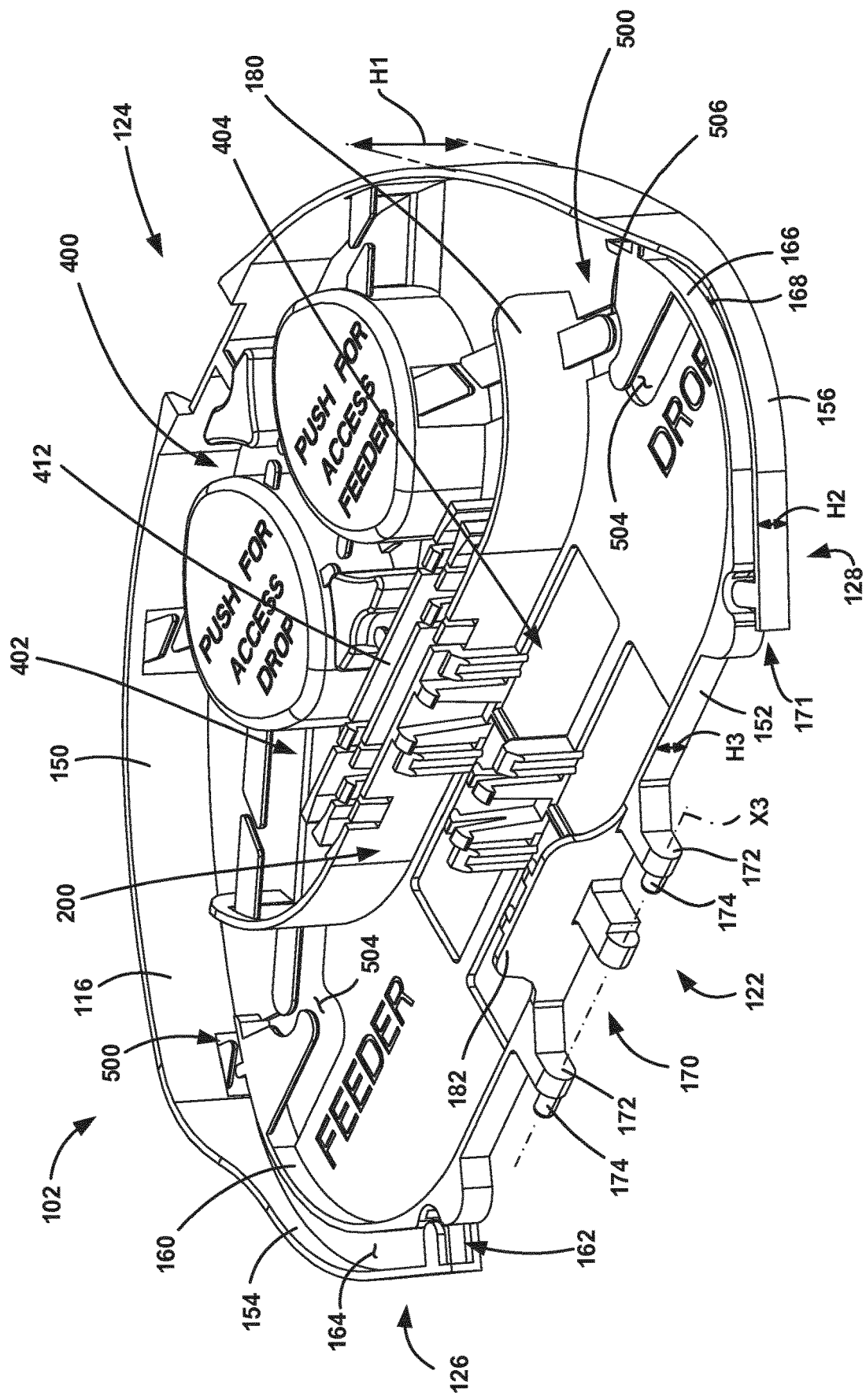
FIG. 5 is a perspective view of a fiber optic telecommunications tray of FIG. 1.
Figure 6:
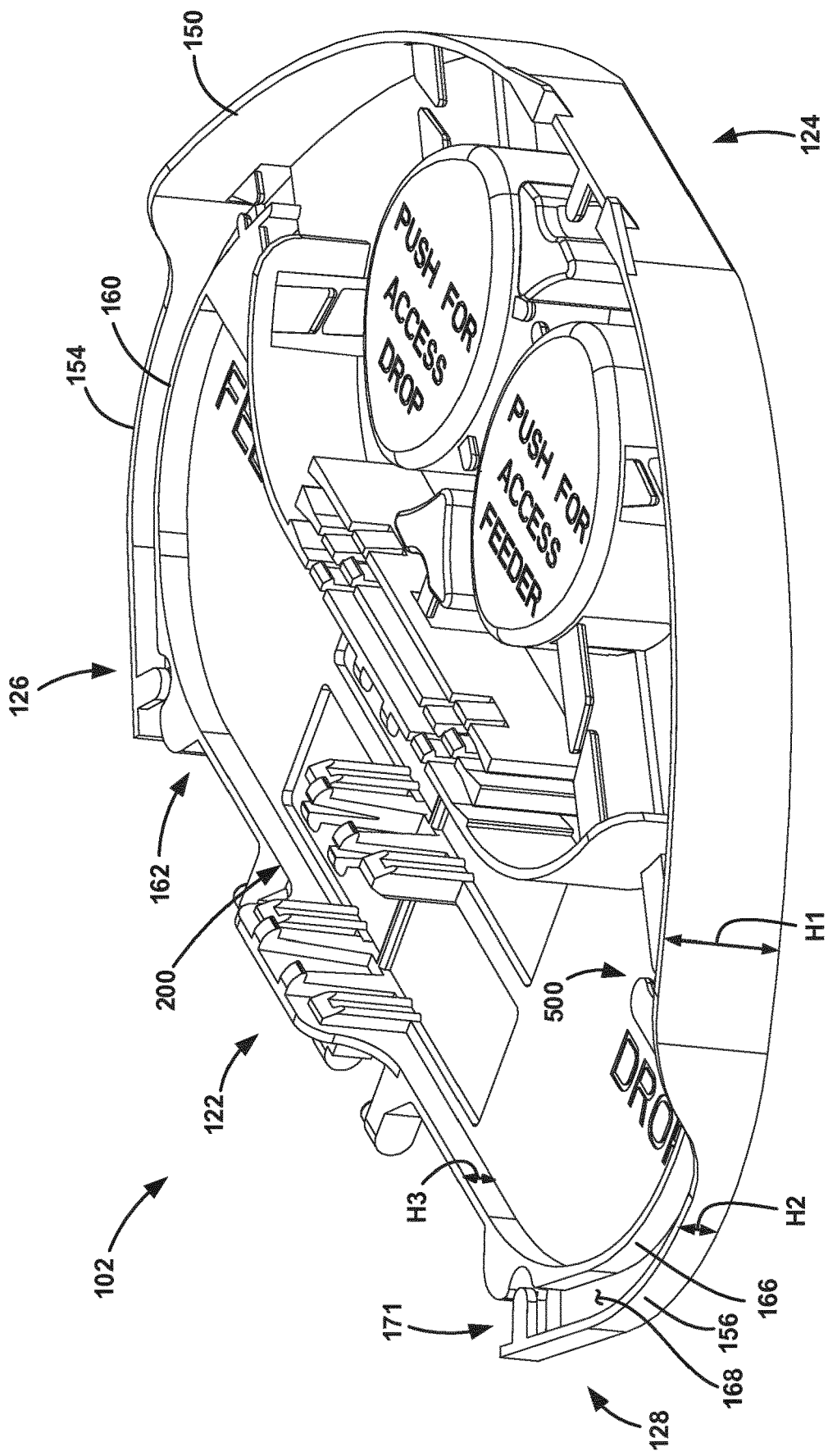
FIG. 6 is another perspective view of the fiber optic telecommunications tray of FIG. 5.
Figure 7:
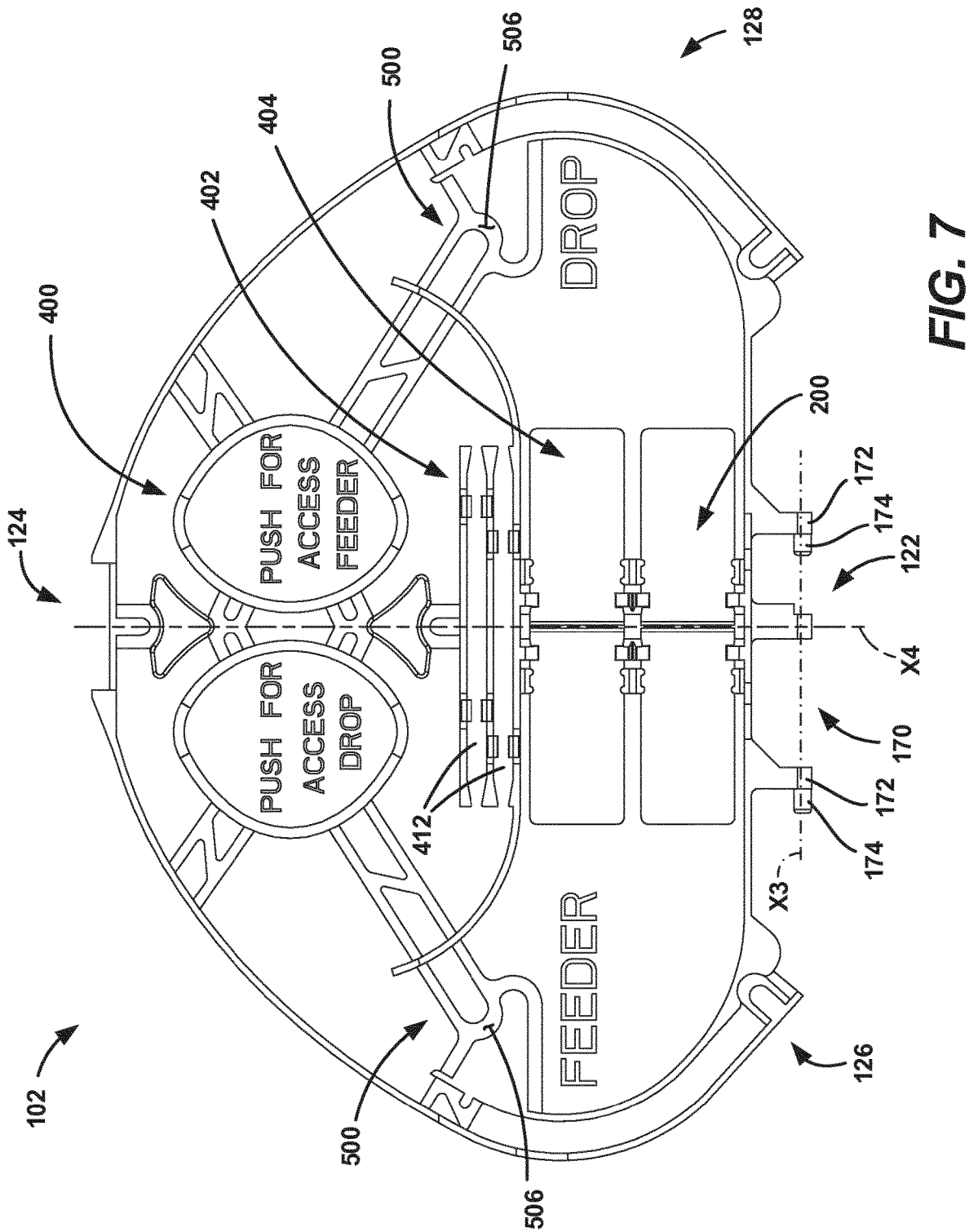
FIG. 7 is a top view of the fiber optic telecommunications tray of FIG. 5.
Figure 8:
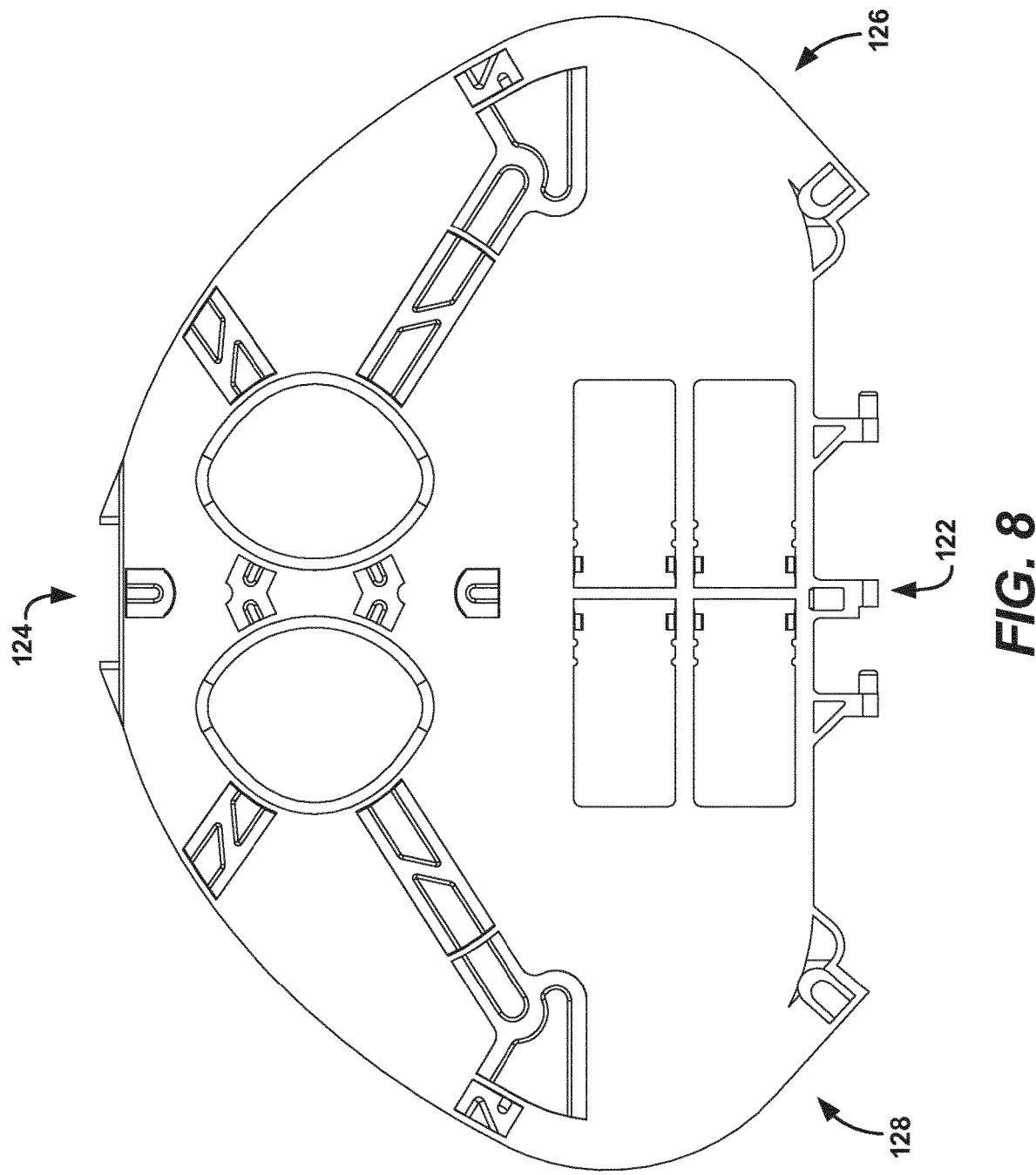
FIG. 8 is a bottom view of the fiber optic telecommunications tray of FIG. 5.

As illustrated in FIG. 2, each of the adapters 104 includes an adapter body 302 having a first port 304 and a second port 306 opposite to, and aligned with, the first port 304. The first port 304 is configured to receive one of mating connectors 106 (i.e., a first connector which provides a first connectorized fiber), and the second port 306 is configured to receive the other of the mating connectors 106 (i.e., a second connector which provides a second connectorized fiber). In some examples, the adapter 104 is a simplex optical adapter including only these two ports 304, 306. In other examples, the adapter 104 can be a duplex optical adapter, which includes two first ports 304 and two second ports 306, a quadruplex adapter, which includes four first ports 304 and four second ports 306, or another type of optical adapter. Each adapter 104 can include side flanges 308 that extend outwards from the adapter body 302 intermediate the ports 304 and 306.

Referring to FIGS. 5-9, the fiber optic telecommunications tray 102 is further described.

In some examples, the cable containment wall 116 includes a main outer wall 150, a lower outer wall 152, a first entrance outer wall 154, and a second entrance outer wall 156. The main outer wall 150 is arranged at the distal side 124 of the tray 102 and extends upwards from the front side 118 of the base plate 114, defining a portion of the periphery of the main body 112 on the base plate 114 at the distal side 124. The lower outer wall 152 is arranged at the proximate side 122 of the tray 102, generally opposite to the main outer wall 150.

The first entrance outer wall 154 is arranged at the first cable entrance side 126 of the tray 102 and extends upwards from the front side 118 of the base plate 114, defining a portion of the periphery of the main body 112 on the base plate 114 at the first cable entrance side 126. In the illustrated example, the first entrance outer wall 154 extends continuously from the main outer wall 150, although alternatives are possible.

In some examples, the cable containment wall 116 further includes a first entrance inner wall 160 extending upwards from the front side 118 of the base plate 114 and arranged to be parallel with the first entrance outer wall 154. A first cable guide channel 164 can be defined between the first entrance inner wall 160 and the first entrance outer wall 154 and configured to guide fibers or cables entering or exiting a first entrance opening 162. In some examples, the first entrance inner wall 160 extends continuously from the lower outer wall 152.

Opposite to the first entrance outer wall 154, the second entrance outer wall 156 is arranged at the second cable entrance side 128 of the tray 102 and extends upwards from the front side 118 of the base plate 114, defining a portion of the periphery of the main body 112 on the base plate 114 at the second cable entrance side 128. In the illustrated example, the second entrance outer wall 156 extends continuously from the main outer wall 150, although alternatives are possible.

In some examples, the cable containment wall 116 further includes a second entrance inner wall 166 extending upwards from the front side 118 of the base plate 114 and arranged to be parallel with the second entrance outer wall 156. A second cable guide channel 168 can be defined between the second entrance inner wall 166 and the second entrance outer wall 156 and configured to guide fibers or cables entering or exiting a second entrance opening 171. In some examples, the second entrance inner wall 166 extends continuously from the lower outer wall 152.

In some examples, the first entrance outer wall 154 has a height lower than a height of the main outer wall 150. In addition or alternatively, the second entrance outer wall 156 has a height lower than the height of the main outer wall 150. Similarly, the first entrance inner wall 160 has a height lower than the height of the main outer wall 150. In addition or alternatively, the second entrance inner wall 166 has a height lower than the height of the main outer wall 150. In the illustrated example, the first entrance outer wall 154 and the second entrance outer wall 156 have the same height H2, which is smaller than a height H1 of the main outer wall 150. In addition, the first entrance outer wall 154 and the second entrance outer wall 156 may have a height identical or similar to the height H2 of the first entrance outer wall 154 and the second entrance outer wall 156, which is smaller than the height H1 of the main outer wall 150. The lower heights of the first and second entrance outer wall 154 and 156 and the first and second entrance inner walls 160 and 166 than the main outer wall 150 improve access to a connectorized fiber connection device 200 (as further described in FIGS. 5-11) in the tray 102 and allow easy installation and removal of the fiber optic adapter 104 and the connectors 106 thereto.

In addition, the lower outer wall 152 is configured to be lower in height than the main outer wall 150. In the illustrated example, a height H3 of the lower outer wall 152 is configured to be identical or similar to the height H2 of the first entrance outer wall 154, the second entrance outer wall 156, the first entrance inner wall 160, and the second entrance inner wall 166.

Referring still to FIG. 5-8, a tray mounting interface 170 is provided to the tray 102, which is configured to mount the tray 102 to a structure, such as a tray mounting plate, a fiber optic terminal, a fiber optic splice terminal, or other type of housing/enclosure. In the illustrated example, the tray mounting interface 170 is provided to the lower outer wall 152 at the proximate side 122. The tray mounting interface 170 can include hinge members 172 attached to the lower outer wall 152 to pivotally connect the tray 102 to the structure. The tray mounting interface 170 allows the tray 102 to rotate or pivot upwardly or downwardly at an angle with respect to a plane of the structure. In other examples, the tray mounting interface 170 can include other mechanical coupling structures, such as pivot mounts, interference fitting, clamps, latches, straps, capture arms, or any other suitable mechanism.

In some examples, the hinge members 172 can include snap-in pivot devices 174 (e.g., pivot pins, pivot rods). The snap-in pivot devices 174 can be configured to engage, for example, clips positioned on the structure. The clips can be configured to hold the snap-in pivot devices 174. The snap-in pivot devices 174 can pivot within the clips of the structure to allow the tray 102 to swing out individually for accessing optical fiber on the tray 102. In other examples, the snap-in pivot devices 174 and clips may be reversed such that the snap-in pivot devices 174 are configured on the structure and the clips are configured on the tray mounting interface 170. An example system suitable for use with trays 102 and showing hinged trays in a stacked arrangement can be found in US Patent Application Publication No. 2014/0321825, the entirety of which is hereby incorporated by reference.

The hinge members 172 can have a hinge axis X3 that is perpendicular to a tray axis X4. The tray 102 is adapted to pivot around the hinge axis X3. In certain examples, lower ones of the trays 102 in a stack can be accessed without removal of superposed trays. One end of the stack can be lifted upwardly or pivoted. After work within that tray 102 is completed, the tray 102 can be returned to its located position in the stack merely by reversing the procedure.

As described herein, the tray 102 may include, for example, one or more fiber guides and one or more splice/termination holders. The tray 102 can include fiber routing paths for routing excess fiber in looped configurations that prevent the fibers from being bent beyond their minimum bend radius requirements. Additionally, the tray 102 can retain and protect additional fiber optic components such as passive optical splitters and/or wavelength division multiplexors.

In certain examples, fiber management trays in accordance with the principles of the present disclosure can include structures for mounting optical fiber splices and/or additional passive optical components on major sides of the trays. In other examples, outputs of optical components can be routed to the tray for splicing to cables. Outputs of the optical component can also be spliced to optical fibers for forward feeding and/or back feeding signals through the main fiber optic cable.

With reference still to FIGS. 5-9, the tray 102 includes a connectorized fiber connection device 200 configured to connect connectorized or ruggedized fibers with each other in the tray 102. The connectorized fiber connection device 200 provides features for movably securing the fiber optic adapter 104 and allowing easy access to the fiber optic adapter 104 when the connectors 106 are inserted into, or removed from, the adapter 104.

The connectorized fiber connection device 200 is arranged in the cable management space 120 on the base plate 114. In some examples, the connectorized fiber connection device 200 is arranged on the base plate 114 at the proximate side 122 of the tray 102 while the radius limiter structure 136 is arranged on the base plate 114 at the distal side 124 of the tray 102. In some examples, an inner partition wall 180 is provided between the connectorized fiber connection device 200 and the radius limiter structure 136. The inner partition wall 180 extends upwards from the front side 118 of the base plate 114 and can be rounded at opposite ends thereof to generally accommodate the curvatures of the lobes 138.

Figure 10:
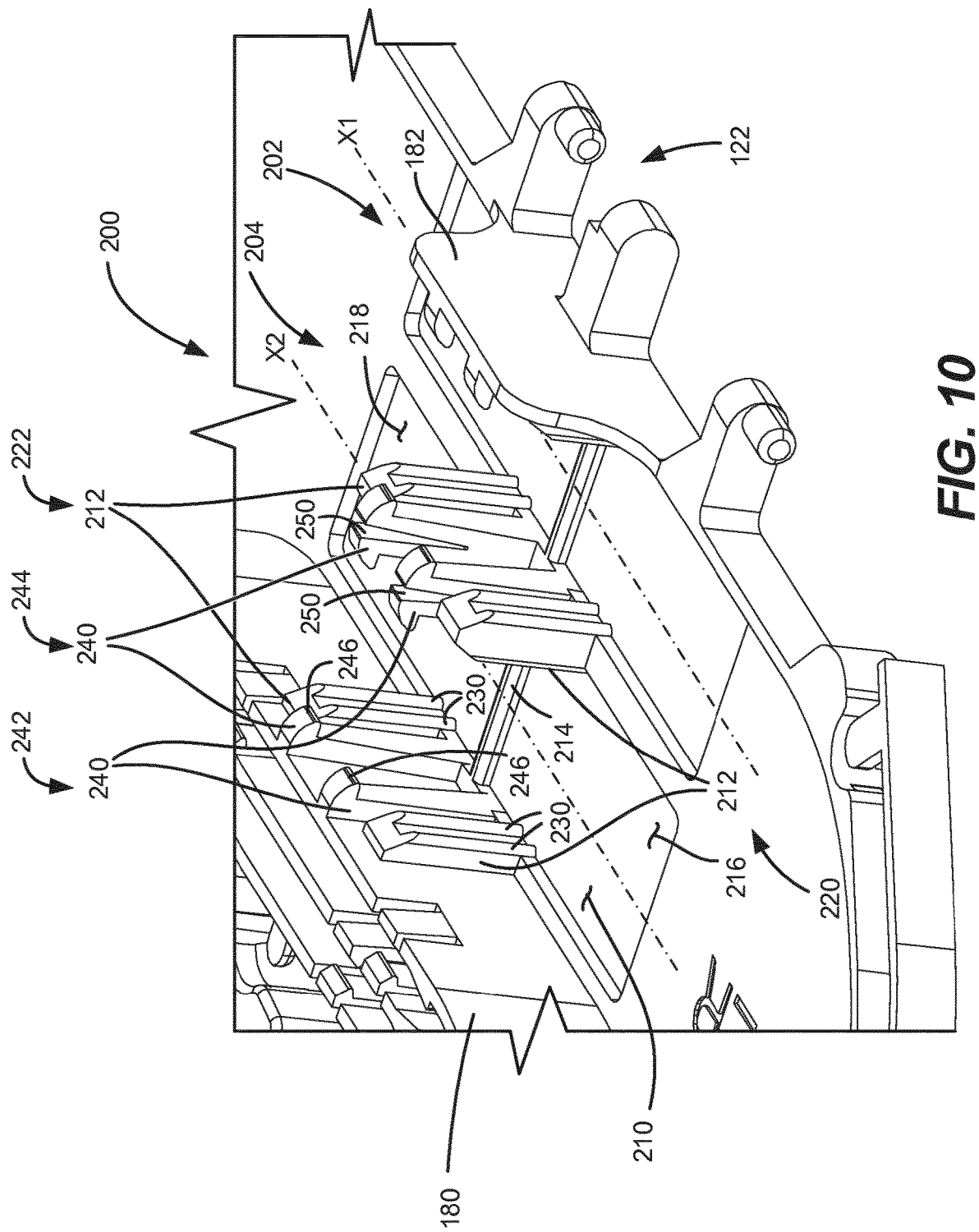
FIG. 10 is an expanded perspective view of an example connectorized fiber connection device in the fiber optic telecommunications tray.
Figure 11:
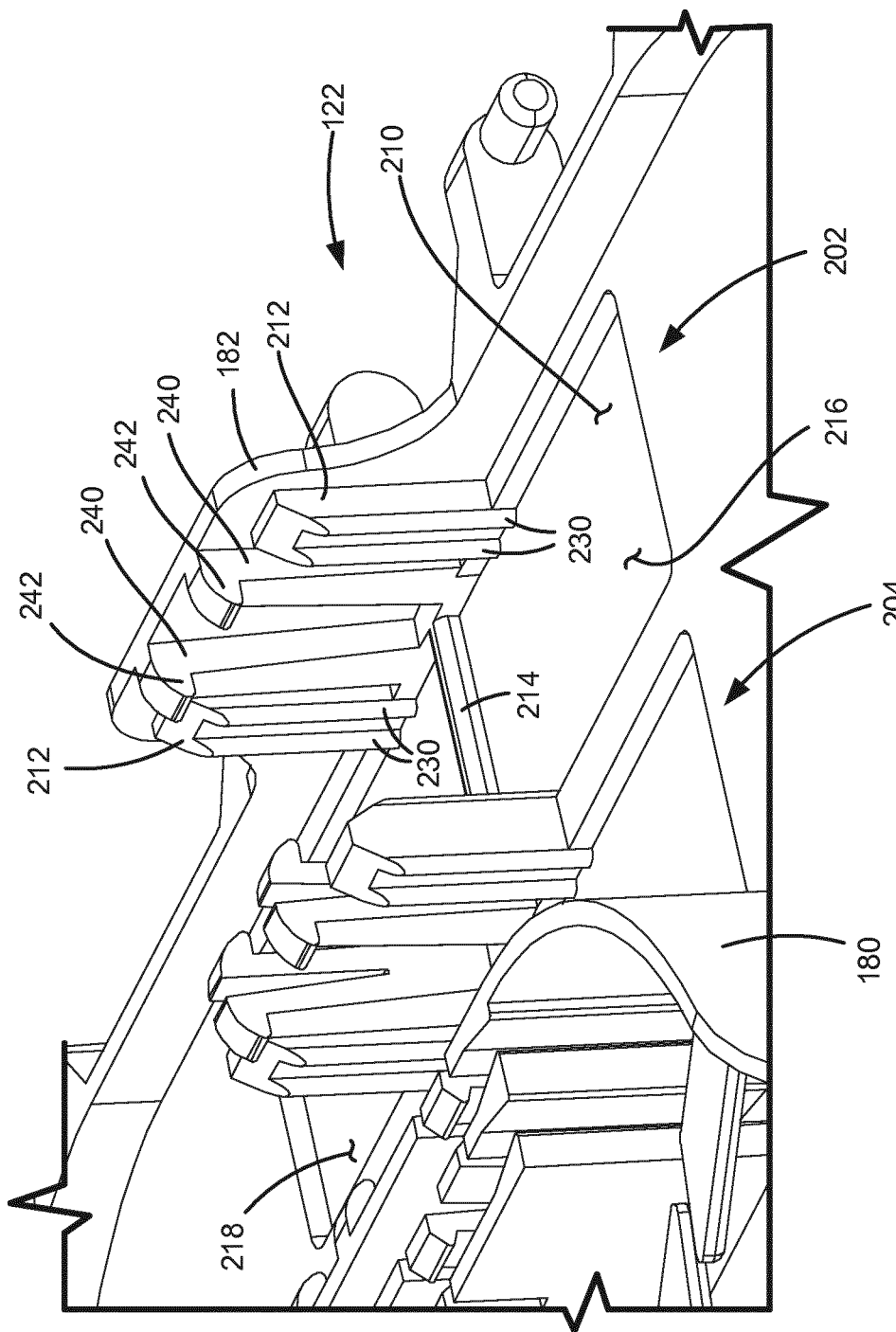
FIG. 11 is another expanded perspective view of the connectorized fiber connection device of FIG. 10.

Referring to FIGS. 10 and 11, the connectorized fiber connection device 200 are further described. The connectorized fiber connection device 200 provides an adapter holder arrangement on the base plate 114 of the tray 102 to receive one or more fiber optic adapters 104. In some examples, the adapter holder arrangement is configured to retain the adapters 104 when the adapters 104 are pushed onto the adapter holder arrangement on the base plate 114. The adapter holder arrangement can be configured to releasably hold the adapters 104.

In the illustrated example, the connectorized fiber connection device 200 is configured to secure two simplex optical adapters 104A and 104B. Although it is primarily described herein that the connectorized fiber connection device 200 is configured to independently support two optical adapters 104A and 104B, it is understood that the connectorized fiber connection device 200 is similarly configured to support a single optical adapter 104 of the same or another type, or three or more of optical adapters 104 of the same or other types, in accordance with the structures and principles of the present disclosure.

The connectorized fiber connection device 200 includes a first adapter holder arrangement 202 and a second adapter holder arrangement 204. The first adapter holder arrangement 202 is configured to arrange and hold the first adapter 104A along the first axis X1. The second adapter holder arrangement 204 is similarly configured to arrange and hold the second adapter 104B along the second axis X1.

For each of the first and second adapter holder arrangements 202 and 204, the connectorized fiber connection device 200 includes an adapter access aperture 210 and adapter holding blocks 212.

The adapter access aperture 210 is defined through the base plate 114 and configured to allow the adapter 104 to at least partially pass therethrough. The adapter access aperture 210 extends along the axis X1, X2. In some examples, a balance bar 214 is provided which at least partially crosses the adapter access aperture 210 to divide the adapter access aperture 210 into two halves, such as a first sub access aperture 216 and a second sub access aperture 218. In the illustrated example, the balance bar 214 extends in a direction perpendicular to the axis X1, X2. As described herein, the balance bar 214 is configured to provide a pivot point around which the adapter 104 is rotated at least partially through either of the first sub access aperture 216 and the second sub access aperture 218, and arranged at an angle relative to the base plate 114.

The adapter holding blocks 212 extend from the base plate 114 and arranged in pairs across the adapter access aperture 210. Each pair of the adapter holding blocks 212 is disposed oppositely with the adapter access aperture therebetween. In the illustrated example, two pairs of adapter holding blocks 212 are provided for each of the adapter access apertures 210. A first pair 220 of adapter holding blocks 212 is oppositely arranged across the first sub access aperture 216, and a second pair 222 of adapter holding blocks 212 is oppositely arranged across the second sub access aperture 218.

Each pair of adapter holding blocks 212 is configured to movably hold the fiber optic adapter 104 therebetween. In some example, the adapter holding blocks 212 in pairs interference-fit the adapter 104 therebetween as the adapter 104 moves between a storage position and an access position. For example, the adapter holding blocks 212 in pairs continue to press against the adapter 104 and hold the adapter 104 therebetween as the adapter 104 moves from the storage position to the access position or vice versa.

In the storage position, the fiber optic adapter 104 is held by the pairs of adapter holding blocks 212 above the adapter access aperture 210, as illustrated in FIGS. 1-4. As illustrated, the adapter 104 is arranged substantially to be parallel with the base plate 114, and the adapter 104 is not arranged to pass through the adapter access aperture 210. In the storage position, the adapter 104, with or without the connectors 106 inserted, is securely disposed within the tray 102.

Figure 12:
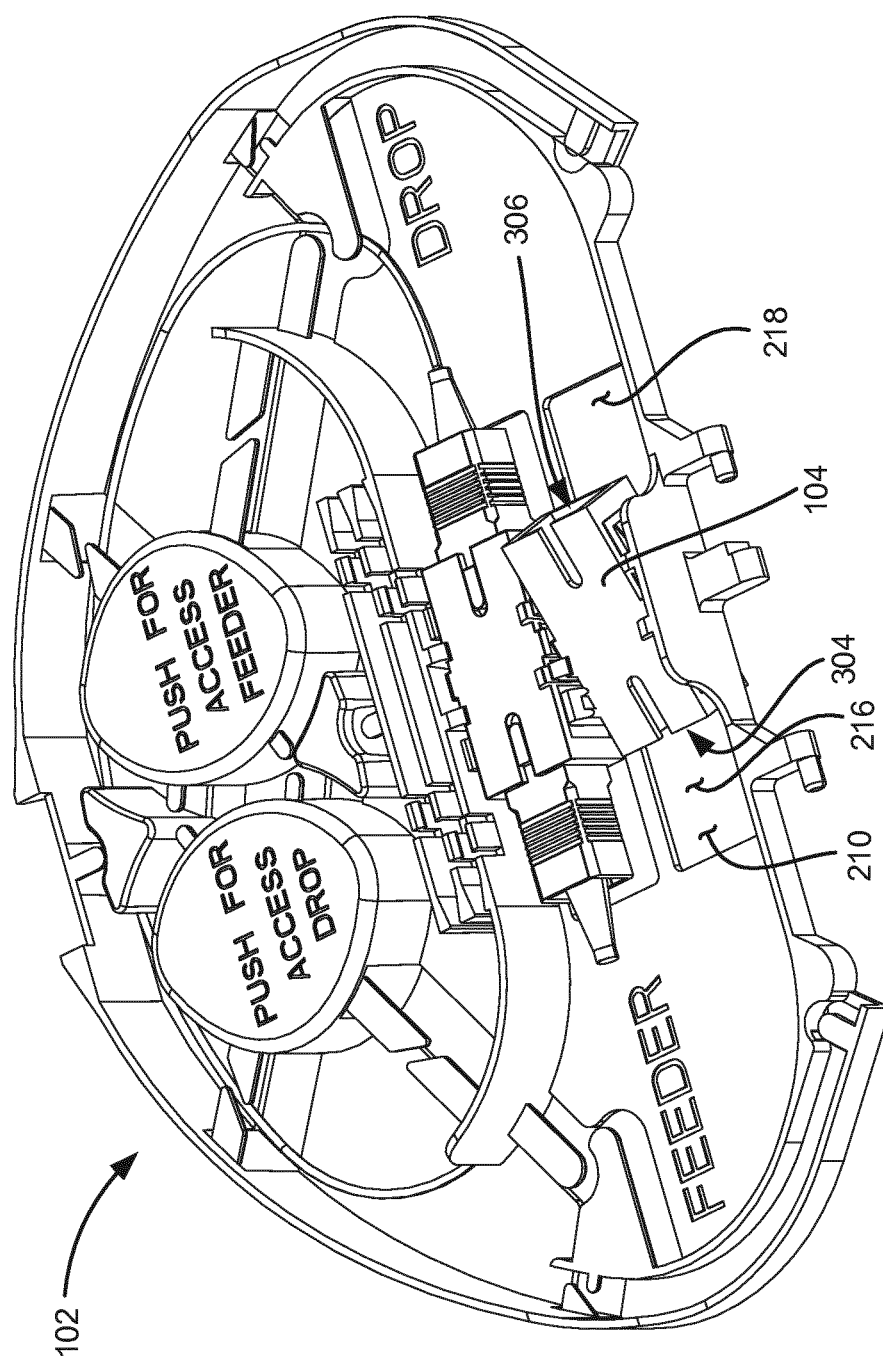
FIG. 12 is a top perspective view of the fiber optic telecommunications tray assembly that illustrates example positions of a fiber optic adapter in the connectorized fiber connection device.
Figure 13:
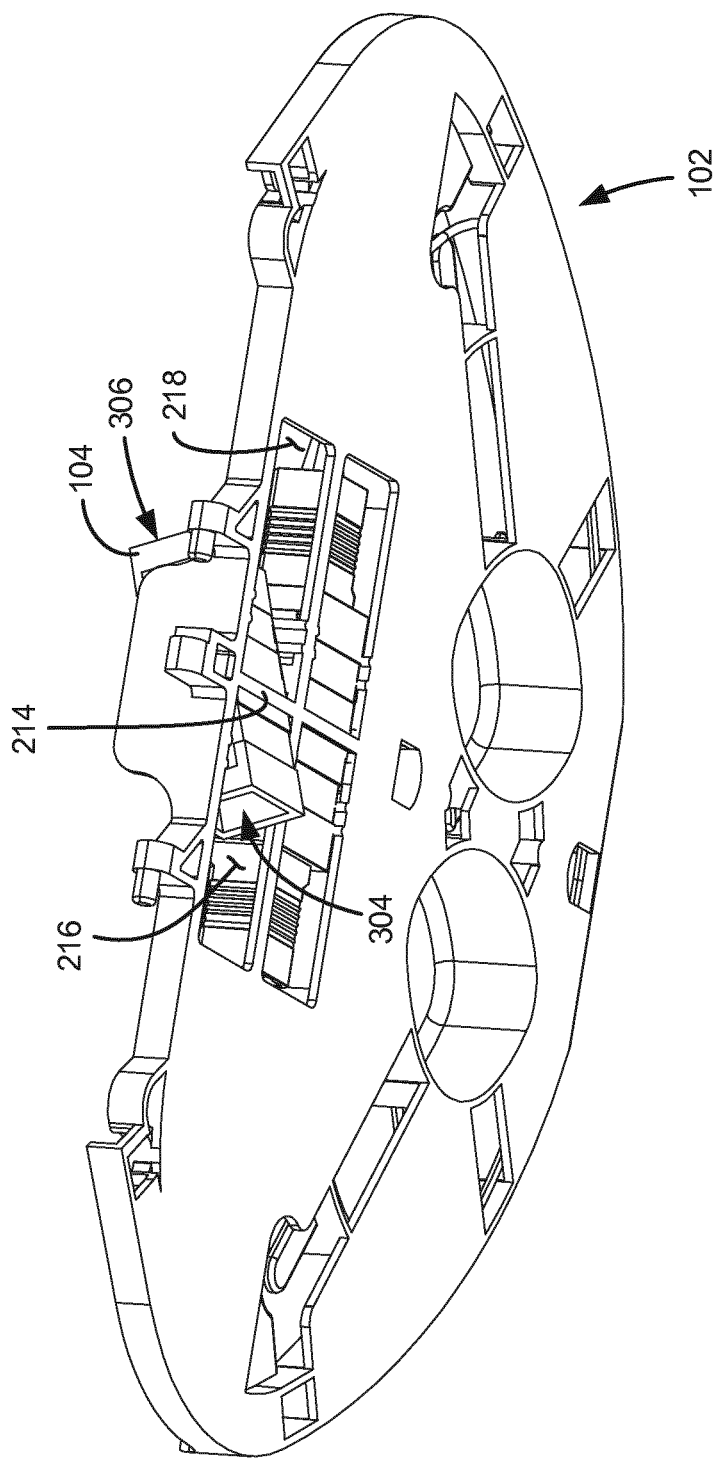
FIG. 13 is a bottom perspective view of the fiber optic telecommunications tray assembly that illustrates example positions of the fiber optic adapter in the connectorized fiber connection device.

In the access position, the fiber optic adapter 104 is held by the pair of adapter holding blocks 212 and arranged at an angle relative to the base plate 114. As illustrated in FIGS. 12 and 13, in some examples, the adapter 104 is arranged to pass through the adapter access aperture 210. In FIGS. 12 and 13, the adapter 104 is tilted in a rotational direction such that one side of the adapter 104 (e.g., the first port side 304) is lowered and passes through the first sub access aperture 216 while the other side of the adapter 104 (e.g., the second port side 306) is raised away from the second sub access aperture 218. When the adapter 104 is rotated in the opposite rotational direction, the one side of the adapter 104 (e.g., the first port side 304) is raised away from the first sub access aperture 216 while the other side of the adapter 104 (e.g., the second port side 306) is lowered and passes through the second sub access aperture 218. In some examples, the adapter 104 is rotated or tilted around the balance bar 214 that operates as a pivot point, as shown best in FIG. 13. As such, when the adapter 104 is in the access position, the adapter 104 is easily accessible for a technician to manage connection through the adapter 104.

The pairs of adapter holding blocks 212 maintain the interference fit against the adapter 104 throughout the movement of the adapter from the storage position to the access position, and vice versa.

In some examples, each adapter holding block 212 can include contact lips 230 configured to press against the adapter 104 (e.g., the adapter body 302 thereof) when the adapter 104 is held between the pair of adapter holding blocks 212. In the illustrated example, each adapter holding block 212 has a pair of contact lips 230 which are spaced apart and extend along longitudinal opposite edges of the adapter holding block 212.

In some examples, in addition to the adapter access aperture 210 and the adapter holding blocks 212, the connectorized fiber connection device 200 includes latching devices 240 (e.g., latching arms) configured to movably latch the adapter 104. The latching devices 240 extend from the base plate 114 and arranged in pairs across the adapter access aperture 210. Each pair of the latching devices 240 is disposed oppositely with the adapter access aperture therebetween. In the illustrated example, two pairs of latching devices 240 are provided for each of the adapter access apertures 210. A first pair 242 of latching devices 240 is oppositely arranged across the first sub access aperture 216, and a second pair 244 of latching devices 240 is oppositely arranged across the second sub access aperture 218.

Each latching device 240 can include a latching hook 246 at a free end thereof. The latching hook 246 is configured to extend over the fiber optic adapter 104 when the adapter 104 is latched between the pair of latching devices 240.

Each pair of the latching devices 240 is configured to movably latch the fiber optic adapter 104 therebetween. In some examples, the pairs of the latching devices 240 allow the adapter 104 to be at least partially removed therefrom. As the adapter 104 is rotated from the storage position (as illustrated in FIGS. 1-4) and moves to the access position (as illustrated in FIGS. 12 and 13), either side of the adapter 104 can be removed from the pair of latching devices 240. For example, when the adapter 104 is tilted such that one side of the adapter 104 (e.g., the first port side 304) is lowered and passes through the first sub access aperture 216 while the other side of the adapter 104 (e.g., the second port side 306) is raised away from the second sub access aperture 218, the other side of the adapter 104 (e.g., the second port side 306) is removed at least from the second pair 244 of latching devices 240 while the one side of the adapter 104 (e.g., the first port side 304) remains constrained under the latching hooks 246 of the first pair 242 of latching devices 240.

In some examples, at least one of the latching devices 240 in each pair is configured to flex as the adapter 104 moves with respect to the latching devices 240, so as to yield the adapter 104 removing from the constraint of the latching devices 240. In the illustrated example, the latching devices 240 arranged between adjacent adapter access apertures 210 are configured to be connected at a base (i.e., a portion close to the base plate 114) and split to form a gap or notch 250 at free ends thereof (i.e., a portion close to the latching hook 246). The latching devices 240 between the adapter access apertures 210 can be flexed when the adapter 104 slides against the latching devices 240 (e.g., against the tip of the latching hooks 246), thereby allowing the adapter 104 to slide out from the latching devices 240.

In some examples, the adapter holding blocks 212 are arranged adjacent the latching devices 240. In the illustrated example, the latching devices 240 arranged closer to the center of the adapter access aperture 210 (e.g., the balance bar 214) than the adapter holding blocks 212.

Some of the adapter holding blocks 212 and the latching devices 240 in the first adapter holder arrangement 202 are arranged at or adjacent an adapter support outer wall 182 at the proximate end 122. These adapter holding blocks 212 and latching devices 240 are paired with corresponding adapter holding blocks 212 and latching devices 240 arranged between the adjacent adapter access apertures 210. The adapter support outer wall 182 can extend upwards from the lower outer wall 152 and configured to support the adapter holding blocks 212 and/or the latching devices 240.

Some of the adapter holding blocks 212 and the latching devices 240 in the second adapter holder arrangement 204 are arranged at or adjacent the inner partition wall 180. These adapter holding blocks 212 and latching devices 240 are paired with corresponding adapter holding blocks 212 and latching devices 240 arranged between the adjacent adapter access apertures 210.

Referring again to FIGS. 1-7, in some examples, the fiber optic telecommunications tray 102 includes a fiber storage device 400, a fiber splice device 402, and a fiber termination device 404.

The fiber storage device 400 is provided to route fibers, store slack or loops of fibers, and organize fibers. The fiber storage device 400 is arranged in, or defines, a fiber storage area of the tray. The fiber storage device 400 includes the radius limiter structure 136. As described herein, the radius limiter structure 136 includes the lobes 138, the main fiber management path 140, and the fiber retention tabs 142 and 144 (e.g., retention tabs, fingers, tines, etc.).

The fiber splice device 402 is configured to hold spliced fibers (e.g., by receiving spliced portions of the fibers). The fiber splice device 402 is arranged in, or defines, a fiber splice area of the tray. The fiber splice device 402 can provide an area in which fibers are spliced. In some examples, the fiber splice device 402 includes a plurality of splice slots 412 configured to receive spliced fibers therein. The fibers can be fusion-spliced and arranged in the splice slots 412.

The fiber termination device 404 is provided to terminate fibers with connectors. The fiber termination device 404 is arranged in, or defines, a fiber termination area of the tray. For example, as illustrated in FIGS. 1 and 2, the fibers can be terminated with the connectors 106. The fiber termination device 404 is configured to support the adapters 104 for receiving connectorized ends of the fibers. Further, the fiber termination device 404 is configured to connect the connectorized fibers in the tray 102. In certain examples, the fiber termination device 404 can include the connectorized fiber connection device 200. As described herein, the fiber termination device 404 can includes one or more fiber optic adapters 104 for receiving the connectors 106 from both ends thereof so that the received connectors 106 are mated within the adapters 104.

In some examples, the tray 102 includes all of the fiber storage device 400, the fiber splice device 402, and the fiber termination device 404. The fiber storage device 400, the fiber splice device 402, and the fiber termination device 404 can be arranged in the tray 102 in various configurations. In the illustrated example of FIGS. 1-7, the tray 102 is configured to arrange the fiber storage device 400, the fiber splice device 402, and the fiber termination device 404 in this order from the distal side 124 to the proximate side 122 of the tray 102. The fiber storage device 400 is arranged adjacent the distal side 124 of the tray, the fiber termination device 404 is arranged adjacent the proximate side 122 of the tray 102, and the fiber splice device 402 is arranged between the fiber storage device 400 and the fiber termination device 404. As described herein, the proximate side 122 of the tray 102 includes a mounting structure (such as the tray mounting interface 170) for mounting the tray 102 to mount the tray 102 to a structure, such as a tray mounting plate, a fiber optic terminal, a fiber optic splice terminal, or other type of housing/enclosure. Further, the proximate side 122 of the tray 102 can be provided with one or more fiber entrances for receiving fibers entering or exiting the tray 102. As described herein, such fiber entrances can include the first cable entrance side 126 and the second cable entrance side 128. As described herein, the distal side 124 is arranged opposite to the proximate side 122 of the tray 102. Where the tray 102 is pivotally mounted to a structure at the proximate side 122, the distal side 124 can be rotated relative to the structure as the tray 102 pivots.

In other examples, the fiber storage device 400, the fiber splice device 402, and the fiber termination device 404 can be arranged in the tray 102 in different configurations or orders. In yet other examples, the tray 102 may include only one or some of the fiber storage device 400, the fiber splice device 402, and the fiber termination device 404.

Figure 14:
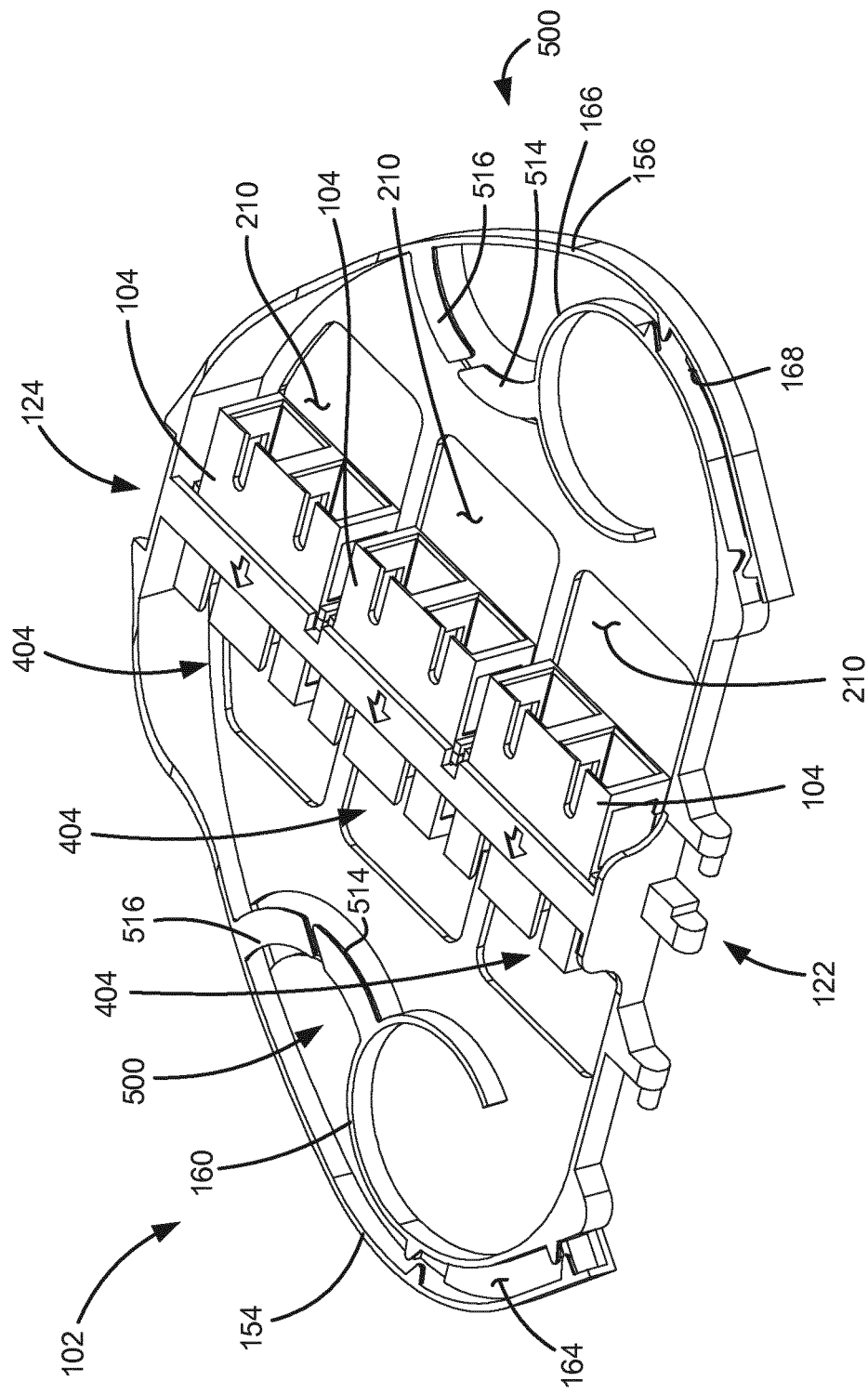
FIG. 14 is a perspective view of a fiber optic telecommunications tray assembly in accordance with another exemplary embodiment of the present disclosure.

Referring to FIG. 14, in an alternative example, the fiber optic telecommunications tray 102 includes a plurality of fiber termination devices 404. In some examples, the tray 102 include the fiber termination devices 404 only, and other devices, such as the fiber storage device 400 and the fiber splice device 402, are not provided to the tray 102. In this example, the fiber termination devices 404 (e.g. three fiber termination devices) are arranged from the proximate side 122 to the distal side 124 of the tray 102. The fiber termination devices 404 may be oriented and arranged in parallel with one another between the proximate side and the distal side. As described herein, each of the fiber termination devices 404 is configured to support one or more adapters 104 for mating connectors 106. In each of the fiber termination devices 404 includes an adapter access aperture 210 defined through the base plate 114 and configured to allow access to the adapter from the rear side (i.e., the side opposite to the top surface 118) of the tray 102. In the illustrated example, each of the fiber termination devices 404 supports a SC duplex adapter. However, other types of adapters, such as a SC simplex adapter and a quad LC adapter, can be engaged in each of the fiber termination devices 404.

Referring to FIGS. 1, 2, 5-7, 14, 15A, 15B, 16A, and 16B, the fiber optic telecommunications tray 102 includes one or more fiber funneling structure 500. The fiber funneling structure 500 is configured to retain one or more fibers 502 that are routed therethrough. The fiber funneling structure 500 can define a fiber passage 504 under the fiber funneling structure (e.g., between the top of the fiber funneling structure 500 and the bottom of the base plate 114. The fibers 502 that are routed through the fiber passage 504 in the cable management space 120 can be retained (e.g., movably held) under the fiber funneling structure 500. Further, the fiber funneling structure 500 has a fiber insertion slot 506 configured to receive the fibers 502 into the fiber passage 504 therethrough.

The fiber funneling structure 500 is configured to enable a technician to conveniently insert the fibers 502 into the fiber passage 504 through the fiber insertion slot 506. In addition, the fiber funneling structure 500 can be configured to make it easy to insert the fibers 502 into the fiber passage 504 through the fiber insertion slot 506 in one direction, and make it difficult to insert the fibers into the fiber passage 504 through the fiber insertion slot 506 in the opposite direction.

For example, the fiber funneling structure 500 is configured to guide a fiber 502 to be inserted to the fiber passage 504 through the fiber insertion slot 506 when being pushed from a first side 508 (e.g., an entrance side) of the fiber funneling structure 500 in a first direction D1 extending across to the fiber funneling structure 500. In addition, the fiber funneling structure 500 can impede insertion of the fiber 502 to the fiber passage 504 through the fiber insertion slot 506 when being pushed from a second side 510 of the fiber funneling structure 500 opposite to the first side 508 in a second direction D2 opposite to the first direction D1.

As illustrated, in some examples, the fiber funneling structure 500 includes a pair of fiber retention tabs 514, 516 extending from the cable containment wall structure 116 above the base plate 114. As described herein, the cable containment wall structure 116 includes the main outer wall 150, the lower outer wall 152, the first entrance outer wall 154, the second entrance outer wall 156, the first entrance inner wall 160, the second entrance inner wall 166, and the inner partition wall 180. The fiber retention tabs 514, 516 can be arranged with respect to any of the walls 150, 152, 154, 156, 180 in the tray 102. In the illustrated example of FIGS. 1-7, the fiber retention tabs 514, 516 are arranged to extend from the entrance inner walls 160, 166 and the inner partition wall 180. In the illustrated example of FIG. 14, the fiber retention tabs 514, 516 are arranged to extend from the entrance inner walls 160, 166 and the entrance outer walls 154, 156. Other arrangements of the fiber retention tabs 514, 516 are also possible.

In some examples, the fiber funneling structure 500 is arranged between the fiber entrance area of the tray (e.g., the cable guide channels 164, 166) and the fiber termination area (e.g., the fiber termination device 404) of the tray. The fiber funneling structure 500 is configured to guide the fibers to be easily routed and retained under the fiber funneling structure 500 (i.e., through the fiber passage 504) in the direction (e.g., the first direction D1 in the illustrated examples) from the fiber entrance area toward the fiber termination area.

In other examples, the fiber funneling structure 500 is arranged between the fiber storage area of the tray (e.g., the fiber storage device 400) and the fiber termination area (e.g., the fiber termination device 404) of the tray. The fiber funneling structure 500 is configured to guide the fibers to be easily routed and retained under the fiber funneling structure 500 (i.e., through the fiber passage 504) in the direction (e.g., the first direction D1 in the illustrated examples) from the fiber storage area toward the fiber termination area.

The fiber retention tabs 514, 516 are elevated from the base plate 114 and define the fiber passage 504 under the fiber retention tabs 514, 516 (i.e., between the fiber retention tabs 514, 516 and the base plate 114). Further, the fiber retention tabs 514, 516 are spaced apart to form the fiber insertion slot 506 therebetween.

Figure 15A:
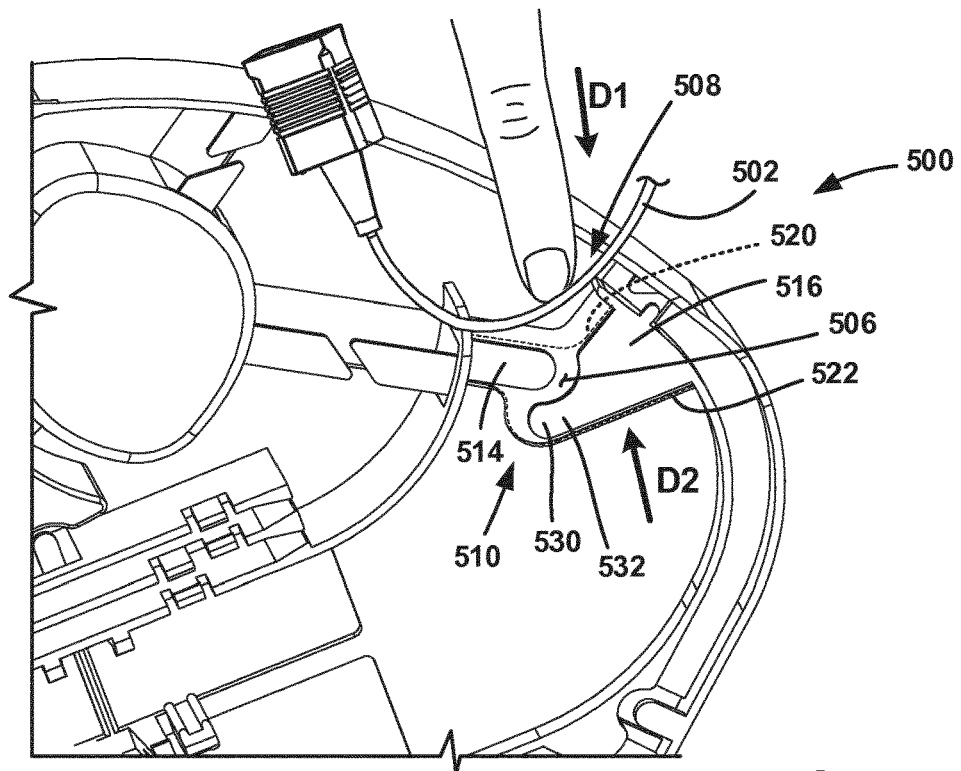
FIG. 15A is a partial view of the fiber optic telecommunications tray assembly of FIGS. 1-13, illustrating a fiber being engaged with an example fiber funnel structure.
Figure 15B:
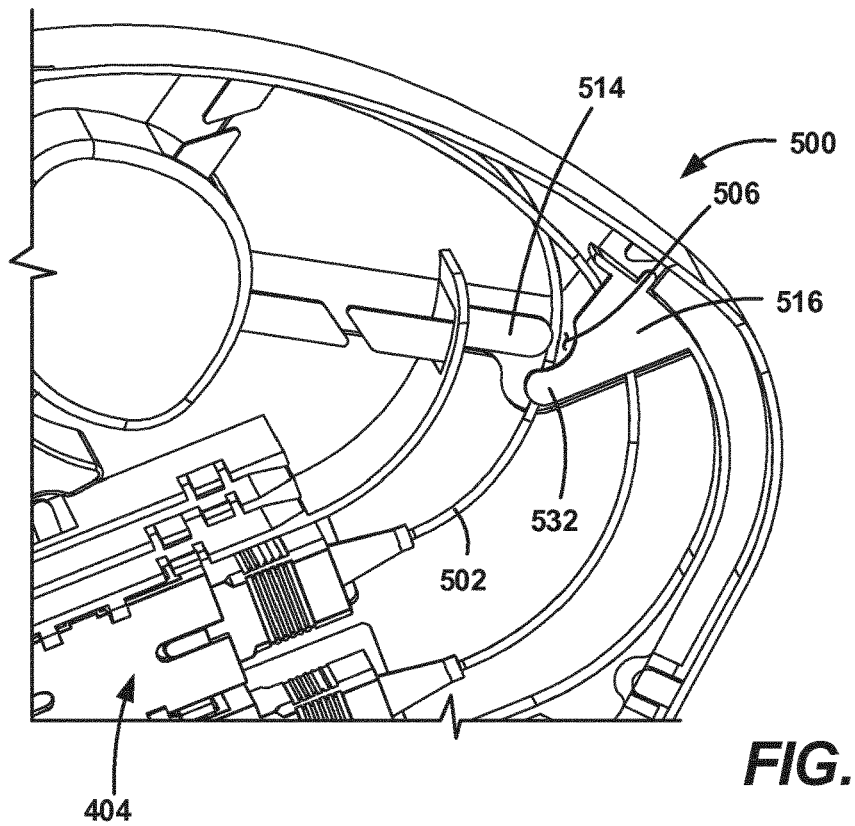
FIG. 15B is a partial view of the fiber optic telecommunications tray assembly of FIG. 15A, illustrating the fiber being retained with the fiber funnel structure.
Figure 16A:
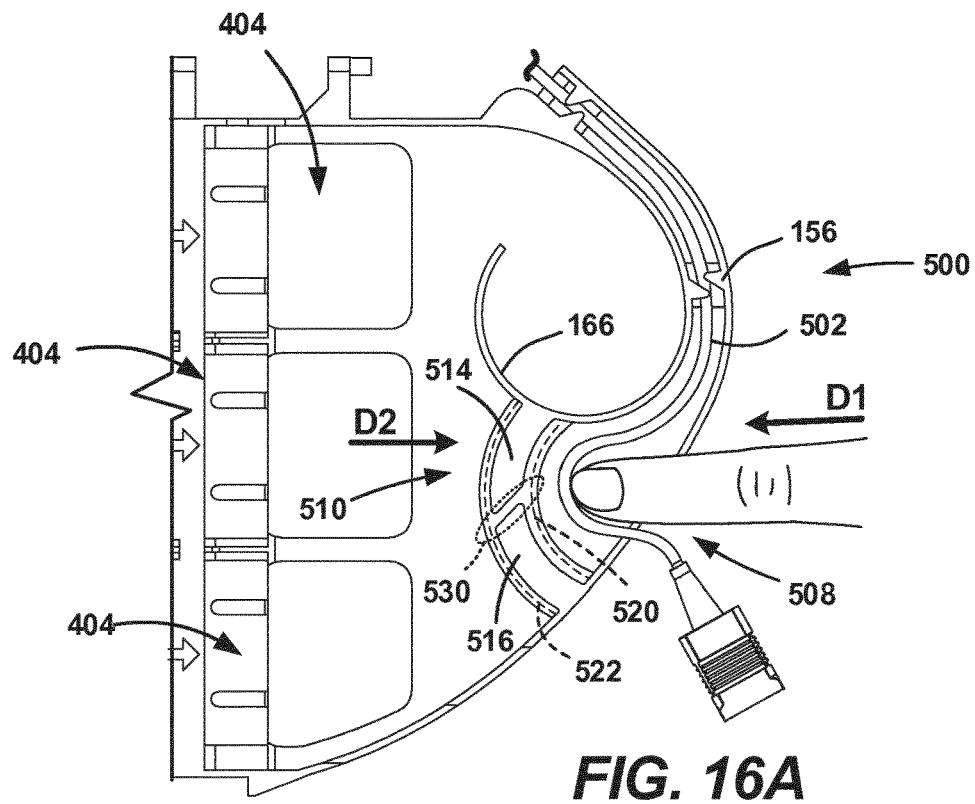
FIG. 16A is a partial view of the fiber optic telecommunications tray assembly of FIG. 14, illustrating a fiber being engaged with an example fiber funnel structure.

In some examples, the fiber retention tabs 514, 516 are configured to form a fiber entrance interface 520 that is generally concave at the first side 508 of the fiber funneling structure 500. As illustrated in FIGS. 15A and 16A, the concave fiber entrance interface 520 can smoothly receive the fiber 502 and guide (e.g., funnel) the fiber 502 into the fiber insertion slot 506 when the fiber 502 is pushed (e.g., by a finger of the technician) from the first side 508 of the fiber funneling structure 500 in the first direction D1.

In addition, the fiber retention tabs 514, 516 can be configured to form a fiber exit interface 522 that is generally convex at the second side 510 of the fiber funneling structure 500. The convex fiber exit interface 522 can hinder (e.g., impede, prevent, or make difficult) the cable from being inserted into the fiber insertion slot 506 from the second side 510 of the fiber funneling structure 500 in the second direction D2, and/or hinder (e.g., impede, prevent, or make difficult) the cable from being pulled out from the fiber passage 504 through the fiber insertion slot 506 from the second side 510 in the second direction D2.

The fiber funneling structure 500 can further include a fiber engagement/disengagement barrier 530 configured to hinder (e.g., impede, prevent, or make difficult) engagement of the fiber 502 to the fiber passage 504 through the fiber insertion slot 506 in the second direction D2, or disengagement of the fiber 502 from the fiber passage 504 through the fiber insertion slot 506 in the second direction D2.

As illustrated in FIGS. 1, 2, 5-7, 15A, and 15B, the fiber engagement/disengagement barrier 530 includes a shroud section 532 configured to partially cover or shield the fiber insertion slot 506 at the second side 510. The shroud section 532 operates to make it difficult to receive the fiber 502 into the fiber insertion slot 506 from the second side 510 in the second direction D2, or pull the fiber 502 out from the fiber passage 504 through the fiber insertion slot 506 from the second side 510 in the second direction D2. In some examples, the shroud section 532 can extend from, or be part of, one of the pair of fiber retention tabs 514, 516. In the illustrated example, the shroud section 532 is integrally formed, with and extend from, the fiber retention tab 516. Other configurations are also possible.

Figure 16B:
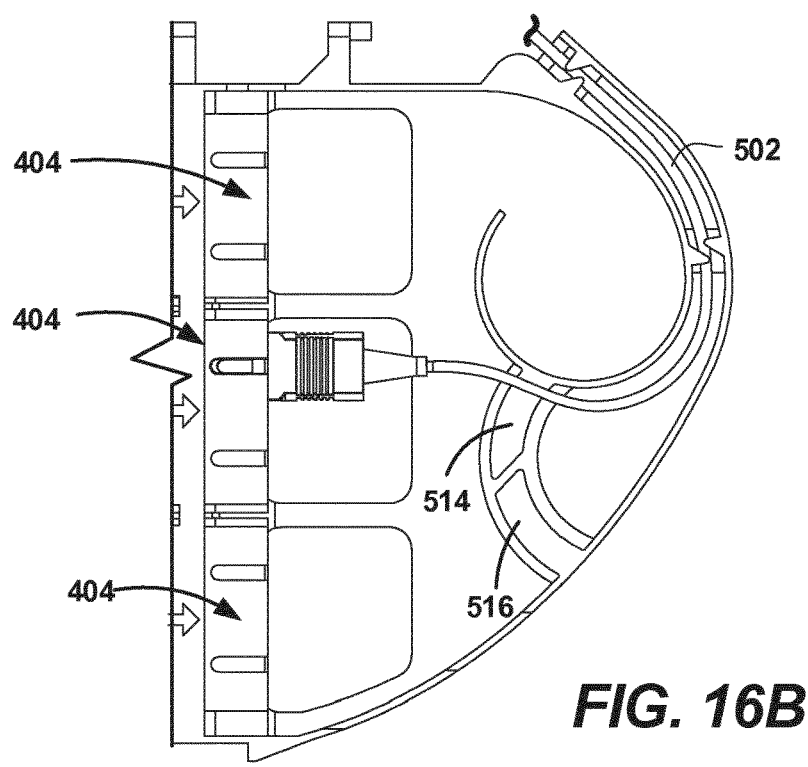
FIG. 16B is a partial view of the fiber optic telecommunications tray assembly of FIG. 16A, illustrating the fiber being retained with the fiber funnel structure.

In addition or alternatively, as illustrated in FIGS. 14, 16A, and 16B, the fiber engagement/disengagement barrier 530 can be formed by the fiber insertion slot 506 that is oriented in a direction different from a curvature of the fiber 502 that passes through the fiber passage 504 and are retained under the fiber funneling structure 500. For example, the fiber insertion slot 506 is formed by the fiber retention tabs 514, 516 to extend substantially across a curvature of the fiber 502 when the fiber 502 is routed through the fiber passage 504 and retained under the fiber retention tabs 514, 516.

As illustrated in FIGS. 15A, 15B, 16A, and 16B, a fiber 502 can be easily engaged with the fiber funneling structure 500 by moving a portion of the fiber 502 toward the fiber funneling structure 500 at the first side 508 in the first direction D1, and pushing the portion of the fiber 502 into the fiber insertion slot 506 from the first side 508 in the first direction D1 until the fiber 502 is inserted into the fiber passage 504 and retained under the fiber funneling structure 500.

In this document, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A fiber optic telecommunications tray, comprising:
   a base plate;
   a cable containment wall structure that extends from the base plate, the cable containment wall structure defining a cable management space on the base plate, the cable containment wall structure including a first portion having a first height positioned at a distal side of the base plate, and a second portion having a second height positioned at a proximal side of the base plate, the second height of the second portion being lower than the first height of the first portion;
   an adapter holder arrangement positioned on the base plate in the cable management space, the adapter holder arrangement configured to receive one or more fiber optic adapters; and
   at least one adapter access aperture defined through the base plate, the adapter access aperture being positioned under the adapter holder arrangement.

2. The fiber optic telecommunications tray of claim 1, further comprising:
   at least one fiber optic adapter held by the adapter holder arrangement on the base plate.

3. The fiber optic telecommunications tray of claim 2, further comprising:
   one or more fiber optic connectors received in the at least one fiber optic adapter, each of the one or more fiber optic connectors terminating optical fibers in the cable management space.

4. The fiber optic telecommunications tray of claim 3, wherein the at least one fiber optic adapter and the one or more fiber optic connectors do not extend beyond the first height of the first portion of the cable containment wall.

5. The fiber optic telecommunications tray of claim 2, wherein the at least one fiber optic adapter includes at least one SC duplex, SC simplex, and quad LC adapter.

6. The fiber optic telecommunications tray of claim 1, wherein the adapter holder arrangement supports first and second fiber optic adapters arranged parallel with each other.

7. The fiber optic telecommunications tray of claim 1, wherein the adapter holder arrangement supports first, second, and third fiber optic adapters arranged parallel with one another between the proximate side and the distal side of the base plate.

8. The fiber optic telecommunications tray of claim 1, further comprising:
   a structure dividing the at least one adapter access aperture into a first sub access aperture and a second sub access aperture.

9. The fiber optic telecommunications tray of claim 1, further comprising:
   a plurality of adapter access apertures, each adapter access aperture of the plurality of adapter access apertures being positioned below a fiber optic adapter held by the adapter holder arrangement on the base plate.

10. The fiber optic telecommunications tray of claim 1, further comprising:

a tray mounting interface arranged at the proximate side of the base plate and configured to mount the fiber optic telecommunications tray to a structure.

11. The fiber optic telecommunications tray of claim 1, further comprising:

a fiber storage device arranged in the cable management space and configured to route and store fibers.

12. The fiber optic telecommunications tray of claim 11, further comprising:

a fiber splice device arranged in the cable management space and configured to hold spliced fibers.

\* \* \* \* \*